(12) United States Patent
Hong et al.

(10) Patent No.: US 7,314,496 B2
(45) Date of Patent: Jan. 1, 2008

(54) HONEYCOMB STRUCTURE

(75) Inventors: Sungtae Hong, Gifu (JP); Teruo Komori, Gifu (JP); Kazushige Ohno, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 323 days.

(21) Appl. No.: 10/493,056

(22) PCT Filed: Sep. 16, 2003

(86) PCT No.: PCT/JP03/11769

§ 371 (c)(1),
(2), (4) Date: Aug. 17, 2004

(87) PCT Pub. No.: WO2004/024293

PCT Pub. Date: Mar. 25, 2004

(65) Prior Publication Data

US 2005/0011174 A1 Jan. 20, 2005

(30) Foreign Application Priority Data

Sep. 13, 2002 (JP) ............................ 2002-267819
Mar. 4, 2003 (JP) ............................ 2003-057631

(51) Int. Cl.
*B01D 46/00* (2006.01)
*F01N 3/023* (2006.01)

(52) U.S. Cl. ..................... 55/523; 55/282.2; 55/282.3; 55/385.3; 55/484; 55/DIG. 10; 55/DIG. 30; 60/311

(58) Field of Classification Search ............... 55/282.2, 55/282.3, 385.3, 523, DIG. 16, DIG. 30, 55/482, 484; 60/311; 428/116, 117, 118

See application file for complete search history.

(56) References Cited

U.S. PATENT DOCUMENTS 4,276,071 A * 6/1981 Outland ....................... 55/523

(Continued)

FOREIGN PATENT DOCUMENTS

DE 100 37 403 A1 2/2002

(Continued)

OTHER PUBLICATIONS

U.S. Appl. No. 10/671,418, filed Sep. 26, 2003, Ohno et al.

(Continued)

*Primary Examiner*—Jason M. Greene
(74) *Attorney, Agent, or Firm*—Oblon, Spivak, McClelland, Maier & Neustadt, P.C.

(57) ABSTRACT

A honeycomb structural body which is capable of increasing the limiting collection amount of particulate, reducing the pressure loss in use, and reducing fluctuations in the pressure loss even if the flow rate from an internal combustion engine of exhaust gases fluctuates. The honeycomb structural body is a columnar honeycomb structural body in which a large number of through holes are arranged side by side in the length direction with a partition wall interposed therebetween. The large number of through holes are constituted by a group of large-capacity through holes, with one end thereof sealed to make the total cross-sectional areas perpendicular to the length direction relatively greater, and a group of small-capacity through holes, with the other end thereof sealed to make the total cross-sectional areas relatively smaller. The honeycomb structural body includes a plurality of columnar porous ceramic members.

20 Claims, 12 Drawing Sheets

U.S. PATENT DOCUMENTS

| | | | |
|---|---|---|---|
| 4,364,761 A | | 12/1982 | Berg et al. |
| 4,416,676 A | * | 11/1983 | Montierth ............... 55/523 |
| 4,417,908 A | | 11/1983 | Pitcher, Jr. |
| 4,420,316 A | | 12/1983 | Frost et al. |
| 4,643,749 A | * | 2/1987 | Miura .................... 55/523 |
| 4,857,089 A | | 8/1989 | Kitagawa et al. |
| 5,545,243 A | | 8/1996 | Kotani et al. |
| 5,914,187 A | * | 6/1999 | Naruse et al. ............. 55/523 |
| 5,930,994 A | | 8/1999 | Shimato et al. |
| 6,395,370 B1 | | 5/2002 | Noda et al. |
| 6,447,564 B1 | | 9/2002 | Ohno et al. |
| 6,565,630 B2 | | 5/2003 | Ohno et al. |
| 6,669,751 B1 | | 12/2003 | Ohno et al. |
| 6,696,132 B2 | * | 2/2004 | Beall et al. .............. 55/523 |
| 6,716,512 B2 | | 4/2004 | Yamamoto et al. |
| 2002/0180117 A1 | | 12/2002 | Yamamoto et al. |
| 2003/0041730 A1 | | 3/2003 | Beall et al. |
| 2003/0167755 A1 | | 9/2003 | Nakatani et al. |
| 2004/0031264 A1 | | 2/2004 | Kojima |
| 2004/0033175 A1 | | 2/2004 | Ohno |
| 2004/0055265 A1 | | 3/2004 | Ohno et al. |
| 2004/0097370 A1 | | 5/2004 | Ichikawa et al. |
| 2004/0223892 A1 | | 11/2004 | Kojima |
| 2005/0011174 A1 | | 1/2005 | Hong et al. |
| 2005/0159310 A1 | | 7/2005 | Ohno et al. |
| 2005/0176581 A1 | | 8/2005 | Ohno et al. |
| 2005/0214504 A1 | | 9/2005 | Yoshida |
| 2005/0229565 A1 | | 10/2005 | Yoshida |
| 2005/0247038 A1 | | 11/2005 | Takahashi |
| 2005/0272602 A1 | | 12/2005 | Ninomiya |

FOREIGN PATENT DOCUMENTS

| | | | |
|---|---|---|---|
| EP | 0 089 751 | | 9/1983 |
| EP | 0 277 012 A1 | | 8/1988 |
| EP | 0 658 363 A1 | | 6/1995 |
| EP | 1 142 619 | | 10/2001 |
| EP | 1 170 270 A1 | | 1/2002 |
| EP | 1 174 399 A1 | | 1/2002 |
| EP | 1 447 535 A1 | | 8/2004 |
| FR | 2 789 327 | | 8/2000 |
| FR | 2 840 545 | | 12/2003 |
| JP | 56-124417 | | 9/1981 |
| JP | 56-124418 | | 9/1981 |
| JP | 58-92409 | | 6/1983 |
| JP | 58-150015 | | 9/1983 |
| JP | 58-196820 | | 11/1983 |
| JP | 61-424 | | 1/1986 |
| JP | 62-96717 | | 5/1987 |
| JP | 63-185425 | | 8/1988 |
| JP | 3-49608 | | 7/1991 |
| JP | 3-102016 | * | 10/1991 |
| JP | 5-68828 | | 3/1993 |
| JP | 6-47620 | | 6/1994 |
| JP | 7-124428 | * | 5/1995 |
| JP | 7-163823 | | 6/1995 |
| JP | 3130567 | | 11/2000 |
| JP | 2001-96117 | | 4/2001 |
| JP | 2001-162121 | | 6/2001 |
| JP | 2001-199777 | | 7/2001 |
| JP | 2001-206780 | | 7/2001 |
| JP | 2001-334114 | * | 12/2001 |
| JP | 2003-1029 | | 1/2003 |
| JP | 2003-40327 | | 2/2003 |
| JP | 2003-155908 | | 5/2003 |
| JP | 2004-896 | | 1/2004 |
| WO | WO 01/23069 A1 | | 4/2001 |
| WO | WO 01/53232 A1 | | 7/2001 |
| WO | 02/10562 | | 2/2002 |
| WO | 02/100514 | | 12/2002 |
| WO | WO 03/014539 A1 | | 2/2003 |
| WO | 03/020407 | | 3/2003 |
| WO | WO 03/044338 A1 | | 5/2003 |
| WO | 03/080218 | | 10/2003 |

OTHER PUBLICATIONS

U.S. Appl. No. 10/362,975, filed Mar. 6, 2003, Ohno et al.
U.S. Appl. No. 10/296,027, filed Nov. 19, 2002, Kojima.
U.S. Appl. No. 09/926,795.
U.S. Appl. No. 10/129,126.
U.S. Appl. No. 10/477,741.
U.S. Appl. No. 10/220,283, filed Sep. 10, 2002, Kojima.
U.S. Appl. No. 10/490,206, filed Mar. 29, 2004, Hong et al.
U.S. Appl. No. 10/490,205, filed Mar. 29, 2004, Hong et al.
U.S. Appl. No. 10/493,056, filed Apr. 29, 2004, Hong et al.
U.S. Appl. No. 10/493,056, filed Aug. 17, 2004, Hong et al.
U.S. Appl. No. 10/502,045, filed Jul. 29, 2004, Kudo et al.
U.S. Appl. No. 10/502,054, filed Jul. 30, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 10/521,592, filed Jan. 18, 2005, Ohno et al.
U.S. Appl. No. 11/225,197.
U.S. Appl. No. 10/518,548, filed Jan. 3, 2005, Takahashi.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/143,998, filed Jun. 3, 2005, Saijo et al.
U.S. Appl. No. 11/145,986, filed Jun. 7, 2005, Saijo et al.
U.S. Appl. No. 11/156,569, filed Jun. 21, 2005, Saijo et al.
U.S. Appl. No. 11/174,726, filed Jul. 6, 2005, Ohno et al.
U.S. Appl. No. 11/174,483, filed Jul. 6, 2005, Saijo et al.
U.S. Appl. No. 11/178,461, filed Jul. 12, 2005, Oshimi.
U.S. Appl. No. 11/230,643, filed Sep. 21, 2005, Yoshida.

* cited by examiner

A-A line cross-sectional view (a)

(b)

B-B line cross-sectional view

HONEYCOMB STRUCTURE

CROSS REFERENCE TO RELATED APPLICATION

This application claims benefit of priority to Japanese Patent application Nos. 2002-267819 filed on Sep. 13, 2002, and 2003-57631 filed on Mar. 4, 2003, the contents of which are incorporated by reference herein.

TECHNICAL FIELD

The present invention relates to a honeycomb structural body used as a filter or the like for removing particulates and the like contained in exhaust gases discharged from an internal combustion engine such as a diesel engine.

BACKGROUND ART

In recent years, particulates, contained in exhaust gases that are discharged from internal combustion engines of vehicles such as buses and trucks and construction equipment, have raised serious problems since those particulates are harmful to the environment and the human body.

For this reason, various honeycomb structural bodies, made from porous ceramics, have been proposed as filters capable of collecting particulates from exhaust gases to purify the exhaust gases.

Conventionally, with respect to the above-mentioned honeycomb structural body, a columnar honeycomb structural body 30 in which, as shown in FIG. 6, a number of through holes 31 are placed in parallel with one another in the length direction with partition wall 33 interposed therebetween has been known. As shown in FIG. 6(b), the through hole 31 is sealed with a sealing material 32 at either of ends of its exhaust gas inlet side or exhaust gas outlet side, so that exhaust gases that have entered one through hole 31 are discharged from another through hole 31 after having always passed through the partition wall 33 that separates the through holes 31. In other words, when the honeycomb structural body 30 is installed in an exhaust gas passage of an internal combustion engine, particulates in exhaust gases discharged from the internal combustion engine are captured by the partition wall 33 when passing through the honeycomb structural body 30, so that the exhaust gases are purified.

Moreover, with respect to such a honeycomb structural body, the following structure has been proposed: a through hole with the end on the exhaust gas outlet side being sealed (hereinafter, also referred to as inlet-side through hole) is formed as a through hole with a larger capacity (hereinafter, also referred to as large-capacity through hole) and a through hole with the end on the exhaust gas inlet side being sealed (hereinafter, also referred to as outlet-side through hole) is formed as a through hole with a smaller capacity (hereinafter, also referred to as small-capacity through hole), so that the aperture ratio on the exhaust gas inlet side is made relatively greater than the aperture ratio on the exhaust gas outlet side.

JP Kokai Sho 56-124418 has disclosed a ceramic filter in which through holes having shapes, such as a triangle, a hexagonal shape, a circular shape and a swelled shape, are formed. Moreover, U.S. Pat. No. 4,276,071 (FIGS. 5a and 5p), JP Kokai Sho 56-124417, JP Kokai Sho 62-96717 and U.S. Pat. No. 4,364,761 (FIGS. 5a to 5p) have disclosed arrangements similar to that of JP Kokai Sho 56-124418.

Microfilms of Japanese Utility Model Application No. 56-187890 (JU Kokai Sho 58-92409 (FIG. 6, page 4) have disclosed an exhaust gas filter in which triangular through holes and hexagonal through holes are formed with cell pitches of large-capacity through holes being set approximately in a range from 1.0 to 2.5 mm.

U.S. Pat. No. 4,416,676 (FIGS. 1 to 4) has disclosed a honeycomb filter in which through holes having shapes, such as a triangle, a square, an octagonal shape and a round shape, are formed while the relationship between: the wall thickness between large-capacity through holes; and the wall thickness between the large-capacity through hole and the small-capacity through hole; being defined.

JP Kokai Sho 58-196820, JP Kokoku Hei 3-49608 and U.S. Pat. No. 4,417,908 (FIGS. 3 to 17) have disclosed honeycomb filters in which through holes having shapes such as a triangle, a square and a hexagonal shape as well as honeycomb filters in which the number of through holes on the inlet side is made greater than the number of through holes on the outlet side so that the aperture rate on the exhaust gas inlet side is made relatively greater than the aperture rate on the exhaust gas outlet side.

U.S. Pat. No. 4,420,316 (FIGS. 6 to 9) has disclosed a honeycomb filter in which the number of sealed through holes is modified, which relates to a technique for improving the gas flow rate in the wall portions.

JP Kokai Sho 58-150015 has disclosed a filter which is provided with square through holes and rectangular through holes, with the cross-sectional shape of the through holes being formed into a tapered shape so as to be changed from the gas inlet side toward the outlet side.

JP Kokai Hei 5-68828 and the Japanese Patent gazette No. 3130587 (page 1) have disclosed honeycomb filters in which triangular through holes and hexagonal through holes are formed and the capacity rate of the large-capacity through holes is set to 60 to 70% while the capacity rate of the small-capacity through holes is set to 20 to 30%, with the cell pitch of the large-capacity through holes being set to approximately in a range from 2.5 to 5.0 mm.

French Patent No. 2789327 has disclosed a filter that is provided with through holes having shapes such as a rectangular shape, a square shape, a hexagonal shape and an octagonal shape, with the cross-sectional shape of the through holes being formed into a tapered shape so as to be changed from the gas inlet side toward the outlet side.

International Publication No. 02/100514 and JP Kokai 2001-334114 (FIG. 2) have disclosed filters in which through holes having a round shape and a hexagonal shape are formed. These have also disclosed filter elements in which the ratio of the total area of the cross-section of small-capacity through holes to the total area of the cross-section of large-capacity through holes is set in a range from 40 to 120%.

International Publication No. 02/10562 has disclosed a filter in which square through holes and hexagonal through holes are formed, with the ratio of cross-sections thereof being set in a range from 3:1 to 4:1.

International Publication No. 03/20407 has disclosed a honeycomb structural body in which square through holes are formed with a varied ratio of cross-sectional areas.

In the honeycomb structural bodies described in these patent documents, since the aperture ratio on the exhaust gas inlet side is made relatively greater in comparison with the honeycomb structural body in which the aperture ratio on the exhaust gas inlet side and the aperture ratio on the exhaust gas outlet side are equal to each other, it becomes possible to increase the limiting collection amount of particulates, to lengthen the period up to the recovery process and to miniaturize the structure, when used as a filter for purifying exhaust gases.

However, it has been found that, although these honeycomb structural bodies slightly reduce the rate of increase in pressure loss upon collection of particulates in comparison with a honeycomb structural body in which the aperture ratio on the exhaust gas inlet side and the aperture ratio on the exhaust gas outlet side are equal to each other, they already have high pressure loss even in a state having collected no particulates before the start of use, and consequently have high pressure loss over the entire period of use.

Moreover, the flow rate of exhaust gases is affected not only by the relationship between the displacement of an internal combustion engine that discharges exhaust gases and honeycomb structural body, but also by the operation condition of the internal combustion engine. For example, in the case of automobiles, the flow rate of exhaust gases discharged from the internal combustion engine fluctuates every moment in response to the driving modes (such as, flat-way driving, slope-way driving, high speed driving and low speed driving), and when the flow rate of exhaust gases increases, the back pressure caused by the honeycomb structural body becomes higher, resulting in an abrupt rise in pressure loss. In such cases, since a load is imposed on an engine, the riding comfort of the automobile deteriorates, resulting in a problem of giving the discomfort to the driver.

SUMMARY OF THE INVENTION

The present invention has been made so as to solve the above-mentioned problems, and an object thereof is to provide a honeycomb structural body capable of increasing the limiting collection amount of particulates, reducing the pressure loss in the use and reducing fluctuations in the pressure loss even when the flow rate of exhaust gases from the internal combustion engine fluctuates.

The honeycomb structural body according to the present invention is a columnar honeycomb structure in which a number of through holes that are placed in parallel with one another in the length direction with partition wall interposed therebetween, wherein the above-mentioned plurality of through holes comprises:

a group of large-capacity through holes, with one end thereof being sealed so as to cause the total of areas of cross-section perpendicular to the length direction to become relatively greater; and a group of small-capacity through holes, with the other end thereof being sealed so as to cause the total of areas of the above-mentioned cross-section to become relatively smaller, the above-mentioned honeycomb structural body comprising a plurality of columnar porous ceramic member.

Additionally, with respect to the combination between the above-mentioned group of large-capacity through holes and group of small-capacity through holes, the following combinations are listed: (1) a case where, with respect to each of through holes constituting the group of the large-capacity through holes and each of through holes constituting the group of the small-capacity through holes, the areas of cross sections perpendicular to the length direction are the same, while the number of the through holes constituting the group of large-capacity through holes is greater; (2) a case where, with respect to each of through holes constituting the group of the large-capacity through holes and each of through holes constituting the group of the small-capacity through holes, the areas of cross sections thereof are different from each other, with the numbers of the respective through holes being different from each other; and (3) a case where, with respect to each of through holes constituting the group of the large-capacity through holes and each of through holes constituting the group of the small-capacity through holes, the area of the cross section of the through holes constituting the group of large-capacity through holes is greater, with the numbers of the through holes of the two groups being the same.

Moreover, with respect to the through holes constituting the group of the large-capacity through holes and/or the through holes constituting the group of the small-capacity through holes, those through holes may be formed by using the through holes of one type having the same shape and the same area of cross sections perpendicular to the length direction, or may be formed by using the through holes of two or more types having different shapes and different areas of cross sections perpendicular to the length direction.

Furthermore, with respect to each of the through holes constituting the large-capacity through holes and/or the small-capacity through holes, the shape, the cross-sectional area perpendicular to the length direction, and the like may be different depending on portions from one end toward the other end, and, for example, through holes having a taper shape or the like may be used.

In accordance with the honeycomb structural body of the present invention, since the group of large-capacity through holes and the group of small-capacity through holes are provided, the aperture ratio on the exhaust gas inlet side is made relatively greater by using the group of large-capacity through holes as the through holes on the inlet side, so that it becomes possible to reduce the rise width of the pressure loss at the time the particulates are accumulated. Consequently, in comparison with a honeycomb structural body in which the aperture ratio on the exhaust gas inlet side and the aperture ratio on the exhaust gas outlet side are equal to each other, it becomes possible to increase the limiting collection amount of particulates to consequently lengthen the period up to the recovery process, and to accumulate a greater amount of ashes remaining after the particulates have been burned to consequently lengthen the service life.

Moreover, since the honeycomb structural body of the present invention includes a plurality of columnar porous ceramic members, it becomes possible to greatly reduce the rise width of the pressure loss at the time the particulates are accumulated, and to suppress fluctuations in the pressure loss even at the time that the flow rate of exhaust gases fluctuates in response to the driving state of the internal combustion engine. Furthermore, the structure having a plurality of columnar porous ceramic members makes it possible to reduce a thermal stress that is generated in the use so that the heat resistance is improved, and also to freely adjust the size thereof by properly increasing or reducing the number of the columnar porous ceramic members.

In the honeycomb structural body of the present invention, the plurality of columnar porous ceramic members are desirably combined with one another through a sealing material layer. In the honeycomb structural body of the present invention, since the columnar porous ceramic members are combined with one another through the sealing material layers, it becomes possible to effectively reduce the rise width of the pressure loss at the time the particulates are accumulated, and to suppress fluctuations in the pressure loss even at the time that the flow rate of exhaust gases fluctuates in response to the driving state of the internal combustion engine.

In the honeycomb structural body of the present invention, the distance between centers of gravity of cross sections perpendicular to the length direction of the adjacently located through holes constituting the group of large-capacity through holes is desirably set to the same as the distance between centers of gravity of cross-sections perpendicular to the length direction of the adjacently located through holes constituting the group of small-capacity through holes. In the honeycomb structural body of the present invention, since the distance between centers of gravity of cross-sections perpendicular to the length direction of the adjacently located through holes constituting the group of large-capacity through holes is set to the same as the distance between centers of gravity of cross-sections perpendicular to the length direction of the adjacently located through holes constituting the group of small-capacity through holes, heat is evenly dispersed upon recovery to easily provide an even temperature distribution; thus, it becomes possible to reduce the occurrence of cracks due to thermal stress even after repetitive uses for a long period, and consequently to improve the durability. Moreover, it is possible to easily convert the flow of exhaust gases entering the honeycomb structural body into a turbulent flow.

In the honeycomb structural body of the present invention, the shapes of cross-section perpendicular to the length direction of the through holes constituting the group of large-capacity through holes and/or the through holes constituting the group of small-capacity through holes are desirably formed into a polygonal shape. When the shape of cross-sections perpendicular to the length direction of those through holes constituting the group of large-capacity through holes and/or those through holes constituting the group of small-capacity through holes is formed into a polygonal shape in the honeycomb structural body of the present invention, it becomes possible to easily reduce the area of the partition wall in the cross section perpendicular to the length direction, and consequently to easily increase the aperture ratio; thus, it is possible to achieve a honeycomb structural body that is superior in durability and has a long service life.

In the honeycomb structural body of the present invention, those through holes constituting the group of large-capacity through holes and/or those through holes constituting the group of small-capacity through holes desirably have cross-sections perpendicular to the length direction, each of which has a curved shape in the vicinity of each of the corner portions. When those through holes constituting the group of large-capacity through holes and/or those through holes constituting the group of small-capacity through holes have R-chamfered and/or C-chamfered corner portions in their cross sections perpendicular to the length direction, in the honeycomb structural body of the present invention, it becomes possible to prevent concentration of stress at each of the corners of the through holes, and consequently to prevent the generation of cracks.

In the honeycomb structural body of the present invention, a cross-section perpendicular to the length direction of each of the through holes constituting the group of the small-capacity through holes is desirably formed into a quadrangle or square shape. When the cross section perpendicular to the length direction of each of the through holes constituting the group of the small-capacity through holes is formed into a quadrangle or square shape in the honeycomb structural body of the present invention, it becomes possible to easily reduce the area of the partition wall in the cross section perpendicular to the length direction, and consequently to easily increase the aperture ratio; thus, it is possible to achieve a honeycomb structural body that is superior in durability and has a long service life.

In the honeycomb structural body of the present invention, the area ratio of the cross section perpendicular to the length direction of the group of the large-capacity through holes to the above-mentioned cross section of the group of the small-capacity through holes (cross-sectional area of the group of large-capacity through holes/cross-sectional area of the group of small-capacity through holes) is desirably set in a range from 1.01 to 9.00. When the area ratio of the cross section perpendicular to the length direction of the group of the large-capacity through holes to the above-mentioned cross section of the group of the small-capacity through holes (cross-sectional area of the group of large-capacity through holes/cross-sectional area of the group of small-capacity through holes) is set in a range from 1.01 to 9.00 in the honeycomb structural body of the present invention, the aperture ratio on the exhaust gas inlet side is made relatively greater so that it becomes possible to effectively reduce the rise width of the pressure loss at the time the particulates are accumulated, and consequently to prevent the pressure loss from becoming too high at the initial stage of the use.

The honeycomb structural body of the present invention is desirably used for an exhaust gas purifying apparatus for vehicles. The application of the honeycomb structural body of the present invention to an exhaust gas purifying apparatus for vehicles makes it possible to lengthen the period up to the recovery process, to lengthen the service life, to reduce fluctuations in the pressure loss even when the flow rate of exhaust gases fluctuates in response to the driving state of the combustion engine, to improve heat resistance, and to freely adjust the size of the structure.

Figure 1:
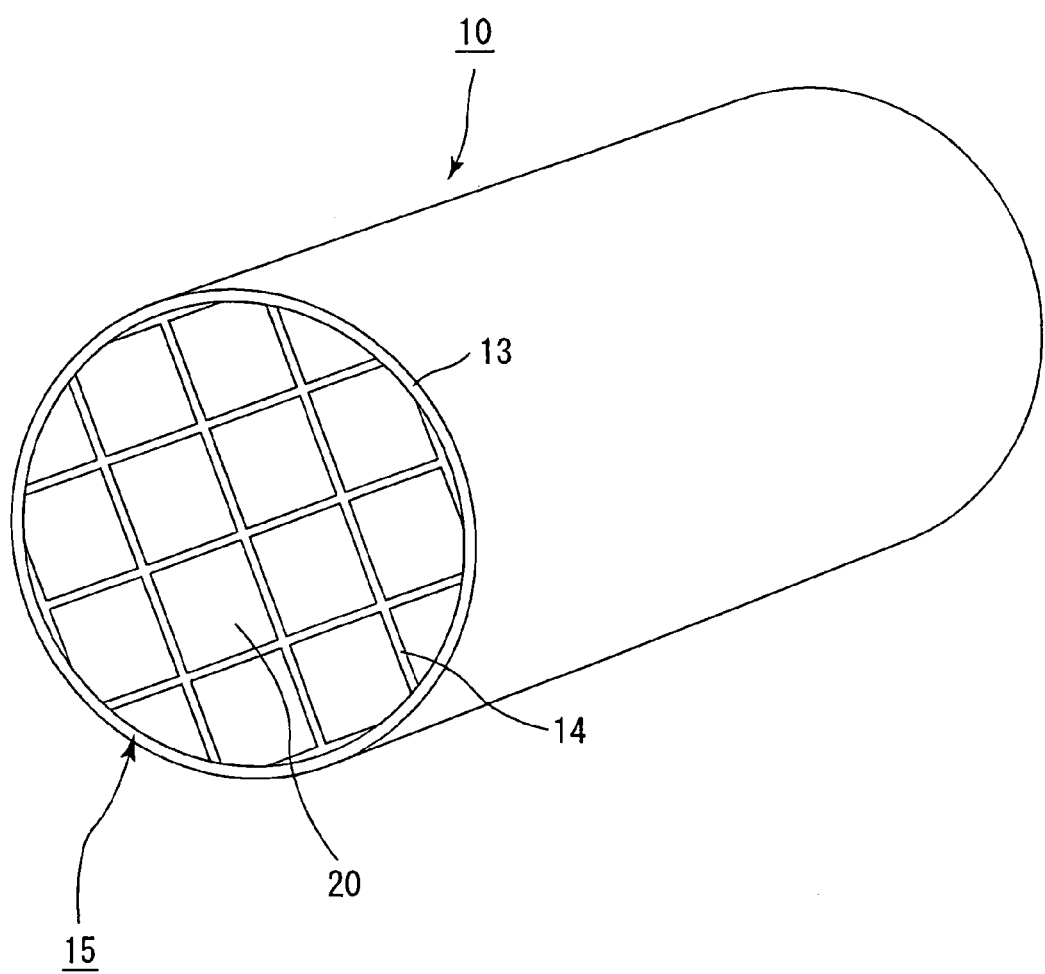
FIG. 1 is a perspective view that schematically shows one example of a honeycomb structural body of the present invention.

EXPLANATION OF SYMBOLS 10, 30 honeycomb structural body
13, 14 sealing material layer
15 ceramic block
20, 40, 50, 70, 90 columnar porous ceramic member
21a, 41a, 51a, 71a, 91a large-capacity through hole
21b, 41b, 51b, 71b, 91b small-capacity through hole
22, 32 sealing member
23, 33, 43, 53, 73, 93 partition wall
31 through hole

DETAILED DISCLOSURE OF THE INVENTION

A honeycomb structural body of the present invention relates to a columnar honeycomb structural body in which a number of through holes are placed in parallel with one another in the length direction with partition wall being interposed therebetween, and the through holes are constituted by a group of large-capacity through holes, with one end thereof being sealed so as to make the total of areas of the cross-section perpendicular to the length direction relatively greater, and a group of small-capacity through holes, with the other end thereof being sealed so as to make the total of areas of the cross-section relatively smaller, and the above-mentioned honeycomb structural body includes a plurality of columnar porous ceramic members.

FIG. 1 is a perspective view that schematically shows one example of a honeycomb structural body of the present invention, and FIG. 2(a) is a perspective view that schematically shows one example of a columnar porous ceramic member that constitutes the honeycomb structural body shown in FIG. 1, and FIG. 2(b) is a cross-sectional view taken along line A-A of the columnar porous ceramic member shown in FIG. 2(a).

Figure 2:
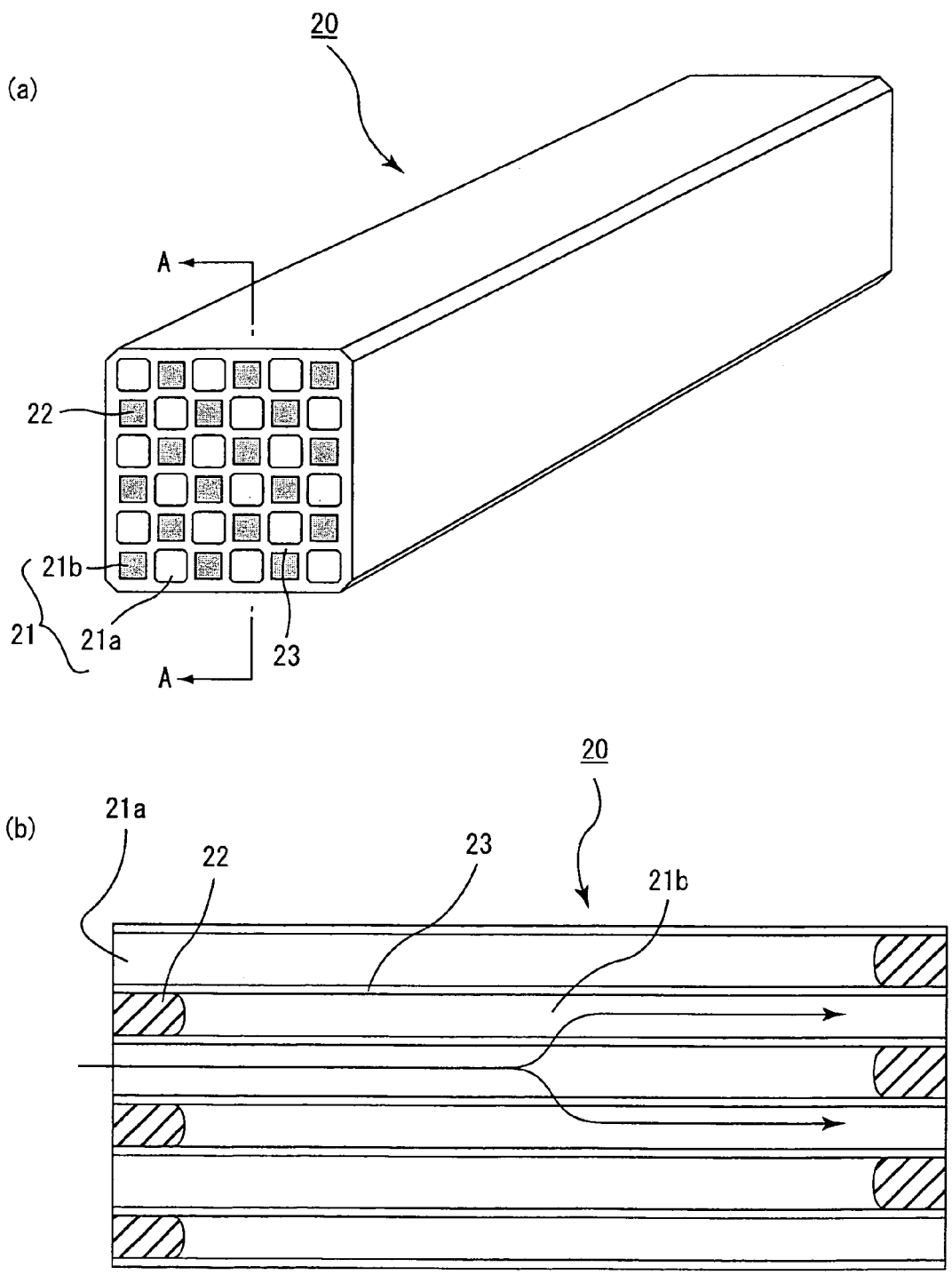
FIG. 2(a) is a perspective view that schematically shows one example of a columnar porous ceramic member that constitutes the honeycomb structural body shown in FIG. 1.
FIG. 2(b) is a cross-sectional view taken along line A-A of the columnar porous ceramic member shown in FIG. 2(a).

As shown in FIGS. 1 and 2, in the honeycomb structural body 10 of the present invention, a plurality of columnar porous ceramic members 20 are combined with one another through sealing material layers 14 to form a ceramic block 15, and a sealing material layer 13 that prevents exhaust gas leak is formed on the circumference of the ceramic block 15.

Additionally, the honeycomb structural body 10 of the present invention shown in FIGS. 1 and 2 is provided with the sealing material layers 13 and 14; however, the honeycomb structural body of the present invention may have a structure in which columnar porous ceramic members 20 are just physically combined with one another physically without the sealing material layers.

In the columnar porous ceramic member 20, a number of through holes 21 are placed in parallel with one another in the length direction thereof, with partition wall 23 being interposed therebetween. The through holes 21 are constituted by two kinds of through holes having the same number, that is, large-capacity through holes 21a with one end thereof being sealed by a sealing member 22 on the outlet side of the columnar porous ceramic member 20 and small-capacity through holes 21b with one end thereof being sealed by the sealing member 22 on the inlet side of the columnar porous ceramic member 20. In other words, in the columnar porous ceramic member 20, the respective large-capacity through holes 21a constituting the group of large-capacity through holes and small-capacity through holes 21b constituting the group of small-capacity through holes constitute a structure wherein cross sections perpendicular to the length direction of the large-capacity through holes 21a constituting the group of large-capacity through holes occupy a greater area, with the numbers of the two kinds of through holes being set to the same. Therefore, the group of large-capacity through holes 21a has a relatively greater area of cross sections perpendicular to the length direction in comparison with the group of small-capacity through holes 21b. Exhaust gases entered the large-capacity through holes 21a are allowed to flow out from the small-capacity through holes 21b after always passing through the partition wall 23 that separate the through holes 21; thus, the partition wall 23 is allowed to function as a filter.

As described in the section of BACKGROUND ART, it has been found that, in a conventional honeycomb structural body, when the aperture ratio on the exhaust gas inlet side is increased, the pressure loss becomes higher in the initial stage of particulate collection.

Figure 10:
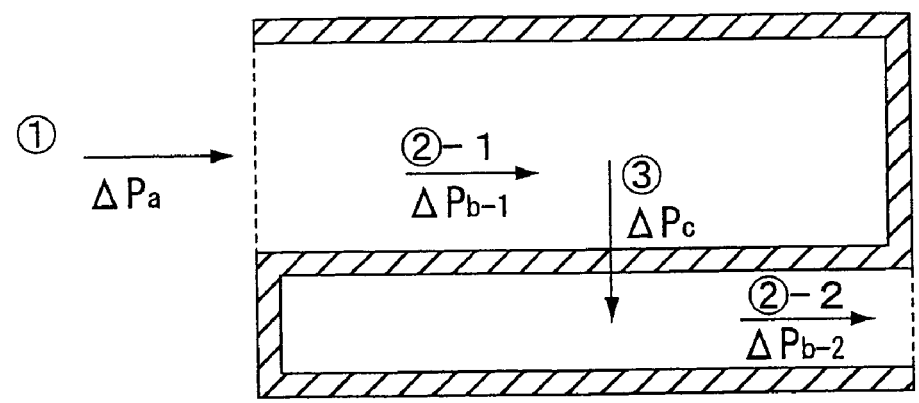
FIG. 10 is a conceptual diagram that shows main factors that cause pressure losses in the honeycomb structural body.
Figure 11:
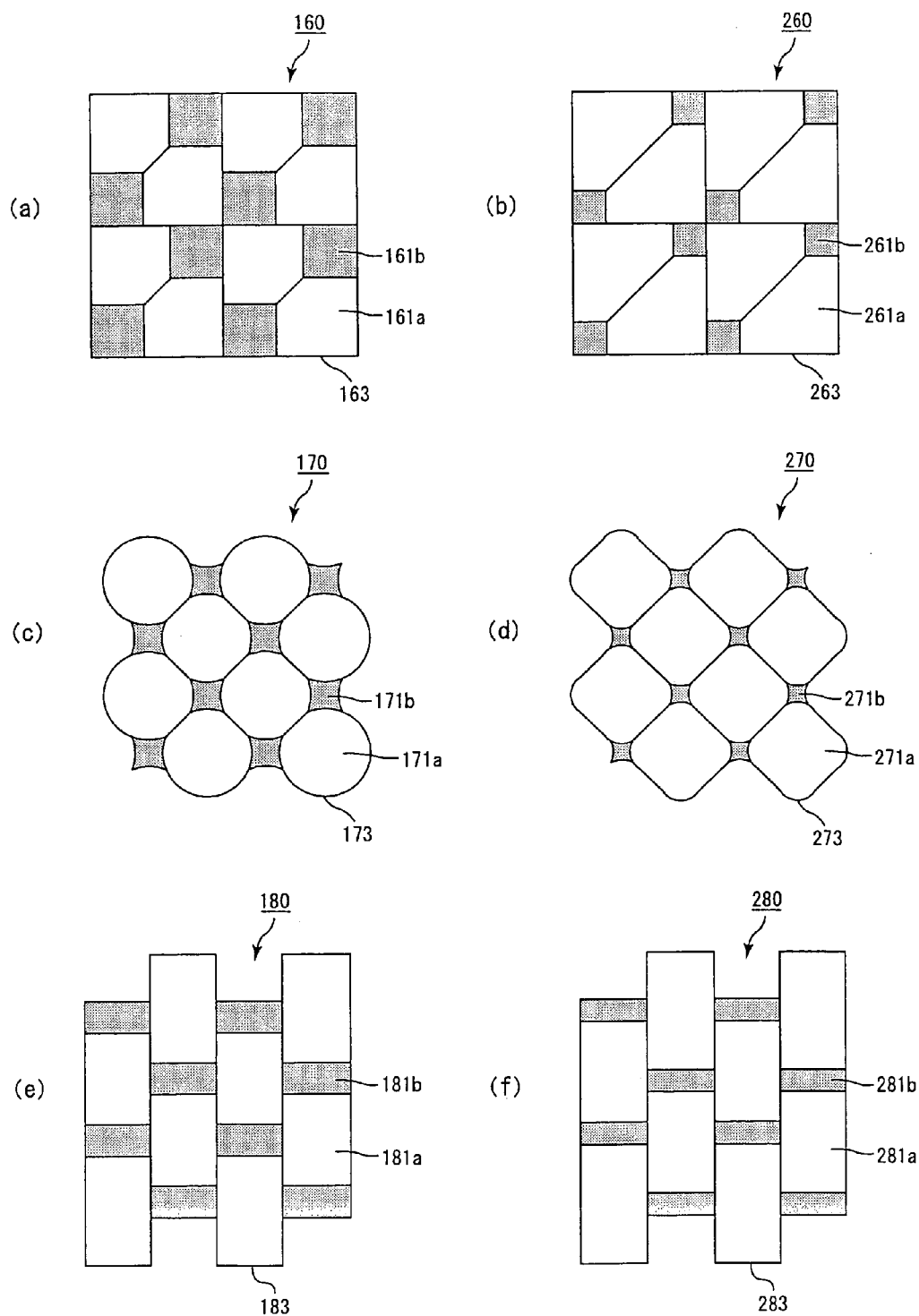
FIGS. 11(a) to 11(f) are cross-sectional views that schematically show examples of cross sections perpendicular to the length direction of columnar porous ceramic members that constitute the honeycomb structural body of the present invention.

FIG. 10 is a conceptual diagram that shows main factors that cause a pressure loss in the honeycomb structural body.

As shown in FIG. 10, the main factors that cause a pressure loss in the honeycomb structural body are: ① an aperture ratio on the exhaust gas inlet side: $\Delta Pa$, ② friction upon passage through through holes (②-1 inlet-side through hole: $\Delta Pb\text{-}1$, ②-2 outlet-side through hole: $\Delta Pb\text{-}2$), ③ resistance upon passage through partition wall: $\Delta Pc$ and the like.

In the honeycomb structural body that is provided with the group of large capacity through holes and the group of small capacity through holes, between the inlet-side through holes and the outlet-side through holes, the total cross-sectional areas perpendicular to the length direction are made different from each other, so that, in comparison with a honeycomb structural body in which the capacities of all the through holes are substantially equal, in a state prior to collection of particulates, since the cross-sectional area of the inlet-side through holes becomes greater, exhaust gases are allowed to easily enter the inlet-side through holes; thus, a pressure loss derived from the aperture ratio on the inlet side and friction exerted upon passage through inlet-side through holes (①: $\Delta Pa$+②-1: $\Delta Pb\text{-}1$) can be reduced. In contrast, since the cross-sectional area of the outlet-side through holes becomes smaller, friction exerted upon passage through outlet-side through holes (②-2: $\Delta Pb\text{-}2$) is increased. Moreover, since the volume of partition wall through which exhaust gases are allowed to directly pass toward the outlet-side through holes, that is, the partition wall (filtration area) portion of which separates the inlet-side through hole and the outlet-side through hole becomes smaller, resistance (③ : ΔPc) exerted upon passage through the partition wall is increased. Consequently, when the aperture ratio on the exhaust gas inlet side is increased, the pressure loss becomes higher in the initial stage of particulate collection.

Therefore, also in the honeycomb structural body 10 of the present invention, since the group of large-capacity through holes 21*a* into which exhaust gases are allowed to flow has a relatively greater capacity than the group of small-capacity through holes 21*b* through which, after passing through the partition wall 23, the exhaust gases are allowed to pass, the area of (filtration area) partition wall through which the exhaust gases pass is made smaller in comparison with the honeycomb structural body in which all the through holes have the same capacity, with the result that upon transmission of exhaust gases and the like, the pressure loss becomes slightly higher in the initial stage of particulate collection.

The present inventors have studied hard, and found that when the aperture ratio on the exhaust gas inlet side is increased, the collection state of particulates in the honeycomb structural body tends to vary, and that this variation in the collection state further causes a rise in the pressure loss in the honeycomb structural body in response to the collection of particulates.

In other words, in the case of a honeycomb structural body in which the aperture ratio on the exhaust gas inlet side is not specifically made relatively higher, the particulates are normally collected in a manner so as to form an almost even thickness over the partition wall. This is presumably because, since the flow-in rate and flow-out rate of exhaust gases are not different so much, even when particulates are at first deposited unevenly, the resistance in partition wall on which the collection of particulates has not progressed becomes relatively lower, as the collection thereof has progressed, so that exhaust gases are allowed to easily enter the corresponding portion, with the result that the particulates are consequently collected evenly on the partition wall.

In contrast, in the case of a honeycomb structural body in which the aperture ratio on the exhaust gas inlet side is made relatively higher, the particulates tend to be deposited in a greater amount at the portion close to the outlet side (in the vicinity of the sealing section) of the inlet-side through holes, and also tend to be deposited in a smaller amount at the portion close to the inlet side thereof. This is because, since the capacity of the inlet-side through holes and the capacity of the outlet-side through holes are different from each other, the flow-in rate of exhaust gases flowing into the honeycomb structural body and the flow-out rate of exhaust gases flowing out the honeycomb structural body are greatly different from each other, with the result that the exhaust gases, entered the inlet-side through hole at the greater flow rate, are caused to once reach the inside end (in the vicinity of the sealing section) easily, and after having circulated inside the through hole, are then allowed to flow into the outlet-side through hole through a portion having smaller resistance in a concentrate manner. The uneven collecting processes of this type are accelerated as the collection is carried out for a long time, with the result that the pressure loss becomes higher.

The honeycomb structural body 10 of the present invention makes it possible to prevent the occurrence of uneven collecting processes even when the collection state of particulates changes due to an increased aperture ratio on the exhaust gas inlet side, and consequently to solve the problem of high pressure loss; thus, even when the aperture ratio on the exhaust gas inlet side is made higher, it becomes possible to suppress a rise in the pressure loss due to collecting processes of particulates.

In other words, the honeycomb structural body 10 of the present invention includes a plurality of columnar porous ceramic members 20.

Since the honeycomb structural body 10 of the present invention is constituted by a plurality of columnar porous ceramic members 20, there are portions at which the columnar porous ceramic members 20 are made in contact with each other through a sealing material layer 14 (through a partition wall 23, when no sealing material layer is formed) so that the aperture ratio is slightly reduced in comparison with a honeycomb structural body that is constituted by a single columnar porous ceramic member. Conventionally, it has been considered that when the aperture ratio decreases, the pressure loss increases due to a reduction in the filtration area; however, the present inventors have found that, in spite of the reduction in the aperture ratio, such a divided structure makes it possible to further reduce the rise width of the pressure loss at the time the particulates are accumulated, and have devised the present invention.

The following description will discuss the reason why the divided structure of the honeycomb structural body makes it possible to reduce the rise width of the pressure loss at the time the particulates are accumulated.

In the case of a honeycomb structural body having an integrated structure having a high aperture ratio on the exhaust gas inlet side, the end face on the exhaust gas inlet side is constituted by three kinds of members, that is, through holes constituting a group of large-capacity through holes, sealing members that seal the through holes constituting a group of small-capacity through holes and a wall (basically formed by repeated partition wall having a fixed thickness), and most of exhaust gases that are allowed to flow toward the end face directly flow into the through holes constituting the group of large-capacity through holes. For this reason, presumably, the exhaust gases that are allowed to flow into the honeycomb structural body reach the inside end of the through holes constituting the group of large-capacity through holes, without any variations in the flow arose at the above-mentioned end face, to cause the above-mentioned uneven collection of particulates.

In contrast, in the case of a honeycomb structural body having a divided structure having a high aperture ratio on the exhaust gas inlet side, the end face on the exhaust gas inlet side is constituted by four kinds of members, that is, through holes constituting a group of large-capacity through holes, sealing members that seal the through holes constituting a group of small-capacity through holes, thin wall (basically formed by a partition wall 23 having a fixed thickness) and a thick wall (formed by a partition wall 23 of one columnar porous ceramic member 20 and a partition wall 23 of another columnar porous ceramic member 20 that are adjacent to each other and made in contact with each other), and part of exhaust gases that are allowed to flow toward the end face directly collide with the above-mentioned thick wall to generate flows that expand in surface directions on the end face so that a turbulence is caused in the flow that is directly introduced into the through holes that constitute the group of large-capacity through holes. For this reason, it is possible to reduce the flow rate of exhaust gases upon entering the through holes constituting the group of large-capacity through holes, and it becomes possible to reduce the amount of the exhaust gases that are allowed to flow at a great flow rate to reach the sealing portion located at the farthest inside end of the through holes constituting the group of large-capacity through holes. In other words, by reducing the flow rate of the exhaust gases inside the inlet-side through holes of the honeycomb structural body, particulates can be evenly collected by the partition wall inside the through holes so that it becomes possible to reduce the pressure loss.

Moreover, since the honeycomb structural body 10 of the present invention includes a plurality of columnar porous ceramic members 20, it is possible to reduce fluctuations in the pressure loss even when the flow rate of exhaust gases fluctuates in response to the driving state of the internal combustion engine. This is because, as the flow rate of exhaust gases that are allowed to flow into the end face becomes higher, the exhaust gases are more easily allowed to enter as parallel flows so that the effect for reducing the flow rate of exhaust gases is exerted more efficiently, and in contrast, in the case where the flow rate of exhaust gases that are allowed to flow to the end face is low, since the flow of the exhaust gases has a disturbance, the honeycomb structural body is inherently unlikely to cause uneven collection, the effect for reducing the flow rate of exhaust gases becomes smaller. In other words, even when the flow rate of exhaust gases that are allowed to flow into the honeycomb structural body fluctuates due to the driving state of the internal combustion engine, the flow rate of exhaust gases inside the honeycomb structural body is maintained in a comparatively stable state. For example, in the case of automobiles, although the driving mode changes every moment during the operation so that the number of revolutions, load and the like change every moment in the internal combustion engine, the honeycomb structural body of the present invention exerts effects more efficiently in accordance with an increase in the flow rate of exhaust gases so that it becomes possible to reduce adverse effects that are given to the driver and the vehicle due to changes in the driving mode.

Moreover, since the honeycomb structural body 10 of the present invention includes a plurality of columnar porous ceramic members 20, it is possible to reduce thermal stress generated in the use, and consequently to improve the heat resistance, and it is also possible to freely change the size by properly reducing or increasing the number of the columnar porous ceramic members 20. For example, even in the case where, in an attempt to increase the aperture ratio, the honeycomb structural body substantially has a low density to become insufficient in strength, the thermal stress can be reduced by using smaller divided members.

Furthermore, in the honeycomb structural body 10 of the present invention, since a plurality of columnar porous ceramic members 20 are combined with one another through sealing material layers 14, it becomes possible to reduce the rise width of the pressure loss at the time the particulates are accumulated more effectively, and also to suppress fluctuations in the pressure loss even at the time that the flow rate of exhaust gases fluctuates in response to the driving state of the internal combustion engine. These effects are obtained presumably because the formation of the sealing material layer 14 further reduces the aperture ratio, and the thickness of the partition wall 23 is considered to become thicker at a portion in which the columnar porous ceramic members 20 are made in contact with each other.

Here, the sealing material layer 14 is desirably allowed to have a bonding function.

Moreover, the sealing material layer 14 desirably has an elastic property that is different from the elastic property of the columnar porous ceramic member 20. In the case where the sealing material layer 14 and the columnar porous ceramic member 20 have different elastic properties from each other, for example, upon receipt of a pressure from exhaust gases in only one of the columnar porous ceramic members 20, only the corresponding one of the columnar porous ceramic members 20 is allowed to finely vibrate even when all the columnar porous ceramic members 20 are integrated by the sealing material layers 14. In this manner, since the individual columnar porous ceramic members 20 are allowed to vibrate independently, the individual columnar porous ceramic members 20 make it possible to individually collect particulates evenly. In contrast, in the case where the sealing material layers 14 and the columnar porous ceramic members 20 have completely the same elastic property, even when the individual columnar porous ceramic members 20 try to vibrate independently, the entire honeycomb structural body tends to move in the same manner, and since considerably large vibration energy is required to generate such a vibration in the entire honeycomb structural body, the vibration actually tends to be cancelled. Therefore, in order to accelerate even particulate-collecting processes and to reduce the pressure loss, the columnar porous ceramic members 20 and sealing material layers 14 desirably have mutually different elastic properties.

With respect to the size of the honeycomb structural body 10 of the present invention, not particularly limited, it is properly determined by taking the size of an exhaust gas passage of the internal combustion engine to be used, and the like into consideration. Moreover, with respect to the shape of the honeycomb structural body of the present invention, not particularly limited as long as it is a column shape, for example, a desired shape, such as a cylinder shape, an elliptical column shape and a rectangular column shape, may be used; and, in general, a cylinder shape as shown in FIG. 1 is used.

With respect to the material for the columnar porous ceramic members in the honeycomb structural body of the present invention, examples thereof may include, but not limited to, nitride ceramics such as aluminum nitride, silicon nitride, boron nitride, titanium nitride and the like, carbide ceramics such as silicon carbide, zirconium carbide, titanium carbide, tantalum carbide and tungsten carbide, and oxide ceramics such as alumina, zirconia, cordierite, mullite and the like. Moreover, the columnar porous ceramic member may be made from two kinds or more materials, such as a composite material of silicon and silicon carbide, and aluminum titanate. In particular, silicon carbide, which is superior in heat resistance and mechanical properties, and also has high thermal conductivity, is desirably used.

Although not particularly limited, the porosity of the columnar porous ceramic members is desirably set to about 20 to 80%. When the porosity is less than 20%, the honeycomb structural body of the present invention is more susceptible to clogging, while the porosity exceeding 80% causes degradation in the strength of the columnar porous ceramic members, with the result that it might be easily broken.

Here, the above-mentioned porosity can be measured through known methods such as a mercury press-in method, Archimedes's method and a measuring method using a scanning electronic microscope (SEM).

The average pore diameter of the columnar porous ceramic members is desirably set in a range from 5 to 100 µm. The average pore diameter of less than 5 µm tends to cause clogging of particulates easily. In contrast, the average pore diameter exceeding 100 µm tends to cause particulates to pass through the pores, with the result that the particulates cannot be collected, making the structural body unable to function as a filter.

With respect to the particle size of ceramic particles to be used upon manufacturing the columnar porous ceramic members, although not particularly limited, however ceramic particles which are less susceptible to shrinkage in the succeeding firing process are desirably used. For example, those particles, prepared by combining 100 parts by weight of ceramic particles having an average particle size from 0.3 to 50 µm with 5 to 65 parts by weight of ceramic particles having an average particle size from 0.1 to 1.0 µm, are desirably used. By mixing ceramic powders having the above-mentioned respective particle sizes at the above-mentioned blending rate, it is possible to provide a porous material.

The sealing member is desirably made from porous ceramics. In the honeycomb structural body of the present invention, since the above-mentioned columnar porous ceramic member is made from porous ceramics, by forming the sealing member using the same porous ceramics as the porous ceramic member, it becomes possible to increase the bonding strength of the two members, and by adjusting the porosity of the sealing material in the same manner as the above-mentioned columnar porous ceramic member, it becomes possible to make the coefficient of thermal expansion of the columnar porous ceramic member consistent with the coefficient of thermal expansion of the sealing member; and it becomes possible to prevent a gap from appearing between the sealing member and the partition wall due to a thermal stress exerted upon manufacturing and using, and also to prevent cracks from occurring in the sealing member and the portion of the partition wall that is made in contact with the sealing member.

In the case where the above-mentioned sealing member is made from porous ceramics, not particularly limited, for example, the same material as the ceramic material forming the above-mentioned columnar porous ceramic members may be used.

In the honeycomb structural body of the present invention, the sealing material layers 13 and 14 are formed between the columnar porous ceramic members 20 as well as on the circumference of the ceramic block 15. The sealing material layer 14, formed between the columnar porous ceramic members 20, is allowed to function as a bonding agent used for combining the columnar porous ceramic members 20 with each other, and the sealing material layer 13, formed on the circumference of the ceramic block 15, is allowed to function as a sealing member for preventing exhaust gas leak from the circumference of the ceramic block 15, when the honeycomb structural body 10 of the present invention is installed in an exhaust gas passage of an internal combustion engine.

With respect to the material for the sealing material layer, not particularly limited, examples thereof include an inorganic binder, an organic binder and a material made from inorganic fibers and/or inorganic particles and the like.

Here, as described above, in the honeycomb structural body of the present invention, the sealing material layers are formed between the columnar porous ceramic members as well as on the circumference of the ceramic block; and these sealing material layers may be made from the same material or may be made from different materials. In the case where the sealing material layers are made from the same material, the blending ratio of the material may be the same or different.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof may include polyvinyl alcohol, methyl cellulose, ethyl cellulose and carboxymethyl cellulose. Each of these may be used alone or two or more kinds of these may be used in combination. Among the organic binders, carboxymethyl cellulose is more desirably used.

With respect to the inorganic fibers, examples thereof may include ceramic fibers, such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof include carbides, nitrides and the like, and specific examples may include inorganic powder or whiskers made from silicon carbide, silicon nitride, boron nitride and the like. Each of these may be used alone, or two or more kinds of these may be used in combination. Among the inorganic fine particles, silicon carbide having superior thermal conductivity is desirably used.

Here, the sealing material layer 14 may be made from a dense material or may be made from a porous material so as to allow exhaust gases to enter the inside thereof, and on the contrary, the sealing material layer 13 is desirably made from a dense material. This is because the sealing material layer 13 is formed so as to prevent exhaust gas leak from the circumference of the ceramic block 15 when the honeycomb structural body 10 of the present invention is placed in an exhaust passage of an internal combustion engine.

In the honeycomb structural body of the present invention having a structure as shown in FIG. 1, the distance between centers of gravity of cross-sections perpendicular to the length direction of the adjacently located through holes constituting the group of large-capacity through holes is desirably equal to the distance between centers of gravity of cross-sections perpendicular to the length direction of the adjacently located through holes constituting the group of small-capacity through holes. With this arrangement, heat is evenly dispersed upon recovery so that the temperature distribution is easily made even; thus, it is possible to provide a honeycomb structural body that is less likely to generate cracks and the like due to thermal stress even after long-term repeated uses, and has superior durability.

Figure 3:
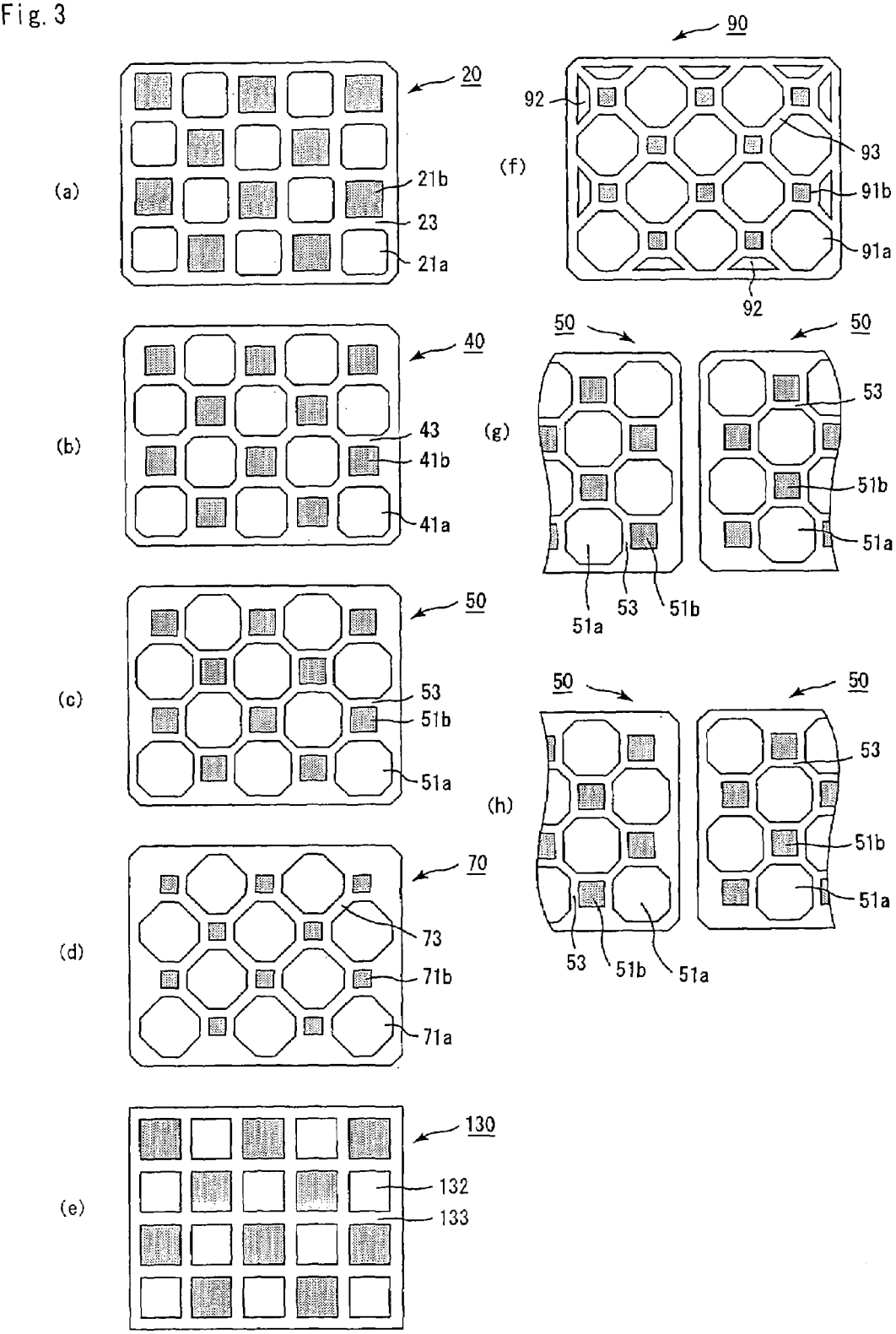
FIGS. 3(a) to 3(d) and 3(f) are cross-sectional views that schematically show examples of cross sections perpendicular to the length direction of the columnar porous ceramic members constituting the honeycomb structural body of the present invention.
FIG. 3(e) is a cross-sectional view that schematically shows a cross section perpendicular to the length direction of a columnar porous ceramic member that constitutes a conventional honeycomb structural body.
FIGS. 3(g) and 3(h) are cross-sectional views that schematically show one example of cross sections perpendicular to the length direction of two adjacently located columnar porous ceramic members that constitute the honeycomb structural body of the present invention.

Moreover, in the case of such a honeycomb structural body having the same distance between centers of gravity, for example, as shown in the honeycomb structural body 70 of FIG. 3(*d*), a difference in thickness of partition wall may be formed based upon a difference in sizes of the through holes on the peripheral portion, or, for example, as shown in the honeycomb structural body 90 of FIG. 3(*f*), a flow of exhaust gases to enter the honeycomb structural body on the peripheral portion is allowed to easily form a turbulent flow by installing through holes 92 having an intermediate size on the peripheral portion.

In addition, as shown in FIG. 3(*g*), by locating the large-capacity through holes adjacent to each other through a sealing member, the flow of exhaust gases to enter the honeycomb structural body is caused to easily form a turbulent flow in the same manner.

Here, in the present specification, "the distance between centers of gravity of cross-sections perpendicular to the length direction of the adjacently located through holes constituting the group of large-capacity through holes" refers to a minimum distance between the center of gravity of a cross-section perpendicular to the length direction of one through hole that constitutes the group of large-capacity through holes and the center of gravity of a cross-section perpendicular to the length direction of another through hole that constitutes the group of large-capacity through holes, and "the distance between centers of gravity of cross-sections perpendicular to the length direction of the adjacently located through holes constituting the group of small-capacity through holes" refers to a minimum distance between the center of gravity of a cross-section perpendicular to the length direction of one through hole that constitutes the group of small-capacity through holes and the center of gravity of a cross-section perpendicular to the length direction of another through hole that constitutes the group of small-capacity through holes.

Moreover, in this honeycomb structural body, the through holes constituting the group of large-capacity through holes and the through holes constituting the group of small-capacity through holes are alternately arranged in the longitudinal direction and/or in the lateral direction with a partition wall being interposed therebetween, and the center of gravity of a cross-section perpendicular to the length direction of each of through holes that constitute the group of large-capacity through holes and the center of gravity of a cross-section perpendicular to the length direction of each of through holes that constitute the group of small-capacity through holes in each of the directions are located on a straight line.

Therefore, "the distance between centers of gravity of cross-sections perpendicular to the length direction of the adjacently located through holes constituting a group of large-capacity through holes" and "the distance between centers of gravity of the cross-sections of the adjacently located through holes constituting a group of small-capacity through holes" refer to a distance between centers of gravity of each large-capacity through hole 21a and each small-capacity through hole 21b that are diagonally adjacent to each other in cross sections perpendicular to the length direction of the honeycomb structural body 10 of the present invention.

In the honeycomb structural body of the present invention, the shapes of cross section perpendicular to the length direction of each of through holes constituting the group of large-capacity through holes and/or a cross section perpendicular to the length direction of each of through holes constituting the group of small-capacity through holes is desirably a polygonal shape. The application of a polygonal shape makes it possible to reduce the area of partition wall in the cross section perpendicular to the length direction of the honeycomb structural body; thus, it becomes possible to easily increase the aperture ratio, and consequently to achieve a honeycomb structural body that has superior durability and a long service life.

In the present invention, among polygonal shapes, those having four or more apexes are desirably used, and in particular, the cross-sectional shape of the large-capacity through hole is desirably set to an octagonal shape. This is because, when a round shape or an elliptical shape is used, the cross-sectional area of the partition wall becomes greater, making it difficult to increase the aperture ratio. Here, only the cross section of through holes constituting the group of large-capacity through holes may be a polygonal shape such as a quadrangle shape, a pentagonal shape, a hexagonal shape, a trapezoidal shape and an octagonal shape, or only the cross section of through holes constituting the group of small-capacity through holes may be the above-mentioned polygonal shape, or both of them may be a polygonal shape. Alternatively, various polygonal shapes may be used in a mixed manner.

Additionally, the honeycomb structural body of the present invention, the cross-sectional shape of the through holes is desirably unchanged from the end face on the exhaust gas inlet side to the end face on the exhaust gas outlet side. Thus, it becomes possible to increase the compression strength, isostatic strength and the like, and also to easily carry out manufacturing processes through extrusion molding.

In the honeycomb structural body of the present invention, the area ratio of the cross section perpendicular to the length direction of the group of the large-capacity through holes to the above-mentioned cross section of the group of the small-capacity through holes (cross-sectional area of the group of large-capacity through holes/cross-sectional area of the group of small-capacity through holes; hereinafter, also referred to as aperture ratio) is desirably set to have a lower limit value of 1.01 and an upper limit value of 9.00. When the aperture ratio is less than 1.01, the effects of installation of the group of large-capacity through holes and the group of small-capacity through holes are hardly obtained. In contrast, when the aperture ratio exceeds 9.00, the capacity of the group of small-capacity through holes becomes too small, with the result that the pressure loss tends to become too large.

The lower limit value of the aperture ratio is desirably set to 1.3, more desirably, to 1.55, most desirably, to 2.0. The upper limit value of the aperture ratio is desirably set to 2.75, more desirably, to 2.54, most desirably, to 2.42. By setting the aperture ratio to these values, it becomes possible to further reduce the pressure loss at the time of collecting particulates and, also, to increase the recovery limit value.

Here, the recovery limit value refers to a collected quantity (g/l) of particulates that might cause cracks and the like in the honeycomb structural body and subsequent damages to the honeycomb structural body, upon carrying out the recovery process, if particulates are collected beyond this value. Therefore, when the recovery limit value is increased, it becomes possible to increase the quantity of particulates that can be collected until the recovery process is required, and consequently to lengthen the period up to the recovery process.

FIGS. 3(a) to 3(d) and FIGS. 11(a) to 11(f) are cross-sectional views each of which schematically shows one portion of a cross section of each of columnar porous ceramic members that constitute a honeycomb structural body of the present invention; and FIG. 3(e) is a cross-sectional view that schematically shows one portion of a cross section of a conventional honeycomb structural body.

The above-mentioned aperture ratio is set to about 1.55 in FIG. 3(a), it is set to about 2.54 in FIG. 3(b), it is set to about 4.45 in FIG. 3(c), it is set to about 6.00 in FIG. 3(d), and it is set to about 1.00 in FIG. 3(e). In all the FIGS. 11(a), 11(c) and 11(e), the above-mentioned aperture ratio is set to about 4.45, and in all the FIGS. 11(b), 11(d) and 11(f), the above-mentioned aperture ratio is set to about 6.00. Here, in the columnar ceramic member 70 shown in FIG. 3(d), the distance between centers of gravity in cross sections of large-capacity through holes 71a constituting a group of large-capacity through holes is equal to the distance between centers of gravity in cross sections of small-capacity through holes 71b constituting a group of small-capacity through holes, and the aperture ratio thereof is 9.86, which is a very big value. As described above, in the case where the aperture ratio is set to a great level exceeding 9.00, the capacity of each of the small-capacity through holes 71b that constitute a group of small-capacity through holes 71b into which exhaust gases that have passed through the partition wall 73 are allowed to flow is too small, with the result that the pressure loss tends to become too large; therefore, in the present invention, the porous ceramic members, shown in FIGS. 3(a) to 3(c), are desirably used.

In the honeycomb structural bodies shown in FIGS. 3(a) to 3(d), the large-capacity through holes and the small-capacity through holes are arranged alternately; thus, the cross-sectional area of the small-capacity through hole is changed, with the cross-sectional shape of the large-capacity through hole being slightly changed, so that the aperture ratio is easily varied desirably. In the same manner, with respect to the honeycomb structural body shown in FIG. 11, the aperture ratio can be varied optionally.

In FIGS. 3(a) to 3(d), the cross-sectional shape perpendicular to the length direction of each of the large-capacity through holes that constitute a group of large-capacity through holes is set to an octagonal shape, and the cross-sectional shape of each of the small-capacity through holes that constitute a group of large-capacity through holes is set to a quadrangle shape (square). Here, the cross-sectional shape perpendicular to the length direction of each of the small-capacity through holes that constitute the group of small-capacity through holes is desirably set to a quadrangle shape (square). This is because, it becomes possible to easily achieve a honeycomb structural body of the present invention having a structure as shown in FIGS. 3(a) to 3(d). Moreover, since the combination of an octagonal shape and a quadrangle shape (square) provide a good symmetrical property, exhaust gases are easily made to flow into the large-capacity through hole evenly, and it is possible to improve the isostatic strength and compression strength. Consequently, it becomes possible to provide a honeycomb structural body having superior resistance to the recovery process.

In honeycomb structural bodies 160 and 260 shown in FIGS. 11(a) and 11(b), the cross-sectional shapes of large-capacity through holes 161a and 261a that constitute the groups of large-capacity through holes are set to a pentagonal shape, and in this shape, three angles are set to substantially right angles, and the cross-sectional shapes of small-capacity through holes 161b and 261b that constitute the groups of small-capacity through holes are set to a quadrangle shape so that these are allowed to respectively occupy portions of a larger quadrangle shape (square) that diagonally face each other. In honeycomb structural bodies 170 and 270 shown in FIGS. 11(c) and 11(d) which have modified shapes of the cross-sections shown in FIGS. 3(a) to 3(d), a partition wall shared by each of large-capacity through holes 171a, 271a constituting the group of large-capacity through holes and each of small-capacity through holes 171b, 271b constituting the group of small-capacity through holes is expanded toward the small-capacity through hole side with a certain curvature. This curvature is optionally set. In FIGS. 11(c) to 11(d), the curved line forming the partition wall that is shared by each of large-capacity through holes 171a, 271a and each of small-capacity through holes 171b, 271b may correspond to a ¼ of the circle. In this case, the shape that makes the aperture ratio smallest is approximately represented by a shape shown in FIG. 11(c), and the aperture ratio at this time is set to about 3.66.

In any of honeycomb structural bodies 180, 280 shown in FIGS. 11(e) to 11(f), rectangular constituent units, each of which has a large-capacity through hole 181a, 281a having a quadrangle shape (rectangular shape) and a small-capacity through hole 281b, 281b that are adjacent to each other longitudinally, are prepared, and these constituent units are continuously placed in the longitudinal direction, and also aligned in the lateral direction in a staggered manner.

Figure 12:
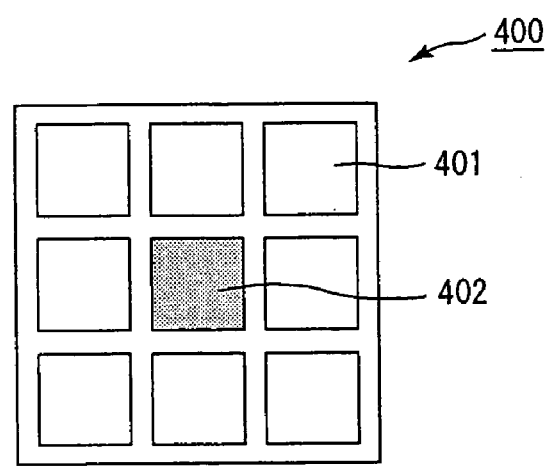
FIG. 12 is a cross-sectional view that schematically shows one example of cross section perpendicular to the length direction of a columnar porous ceramic member that constitutes the honeycomb structural body of the present invention.

With respect to another specific example of the structures of the through holes constituting the group of large-capacity through holes and the group of small-capacity through holes in the cross-sectional shape perpendicular to the length direction of the honeycomb structural body of the present invention, for example, an integrated honeycomb structural body 400 shown in FIG. 12, which has large-capacity through holes 401 constituting the group of large capacity through holes and small-capacity through holes 402 constituting the group of small capacity through holes, is proposed.

The corner portions of a cross section perpendicular to the length direction of each of the through holes constituting the group of large-capacity through holes and/or each of the through holes constituting the group of small-capacity through holes desirably have chamfered faces, such as an R-chamfered face and/or a C-chamfered face. Thus, it becomes possible to prevent concentration of a stress at the corner portions of the through hole, and consequently to prevent the occurrence of cracks.

In this specification, the R-chamfering refers to a chamfering process which makes the corner circular arc. Moreover, the C-chamfering refers to a chamfering process in which, by increasing the number of sides forming the corner, neither acute angles nor right angles are present on the corner.

Moreover, as shown in FIGS. 3(a) to 3(d), the corner portions on the circumference of the columnar porous ceramic member desirably have chamfered faces.

Next, the following description will discuss one example of a manufacturing method for the honeycomb structural body of the present invention.

First, a material paste mainly composed of ceramics as described earlier is subjected to an extrusion-molding process so that a ceramic formed body, which has a shape corresponding to the above-mentioned columnar porous ceramic member 20 as shown in FIG. 2, is formed.

With respect to the above-mentioned material paste, although not particularly limited, those pastes which allow the columnar porous ceramic block 20 after the manufacturing processes to have a porosity of 20 to 80% after the manufacturing processes, and, for example, those pastes prepared by adding a binder and a dispersant solution to the above-mentioned ceramic powder are desirably used.

With respect to the above-mentioned binder, not particularly limited, examples thereof include: methyl cellulose, carboxymethyl cellulose, hydroxyethyl cellulose, polyethylene glycol, phenolic resins, epoxy resins and the like.

Normally, the blend ratio of the above-mentioned binder is desirably set to about 1 to 10 parts by weight to 100 parts by weight of ceramic powder.

With respect to the above-mentioned dispersant solution, not particularly limited, for example, an organic solvent such as benzene, alcohol such as methanol, water and the like may be used.

An appropriate amount of the above-mentioned dispersant solution is blended so that the viscosity of the material paste is set in a predetermined range.

These ceramic powder, binder and dispersant solution are mixed by an attritor or the like, and sufficiently kneaded by a kneader or the like, and then extrusion-molded so that the above-mentioned ceramic formed body is formed.

Moreover, a molding auxiliary may be added to the above-mentioned material paste, if necessary.

With respect to the molding auxiliary, not particularly limited, examples thereof include: ethylene glycol, dextrin, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass micro-balloons, shirasu balloons, fly ash balloons (FA balloons) and mullite balloons may be used. In particular, fly ash balloons are more desirably used.

Further, after the above-mentioned ceramic compact has been dried by using a drier such as a microwave drier, a hot-air drier, a dielectric drier, a reduced-pressure drier, a vacuum drier and a frozen drier, predetermined through holes are filled with sealing material paste to form sealing members so that a mouth-sealing process for plugging the through holes is carried out.

With respect to the above-mentioned sealing material paste, although not particularly limited, those pastes which allow the resulting sealing members after the manufacturing process to have a porosity of 20 to 80%, and, for example, the same material paste as described above may be used; however, those pastes, prepared by adding a lubricant, a solvent, a binder and a dispersant solution to ceramic powder used as the above-mentioned material paste, are desirably used. With this arrangement, it becomes possible to prevent ceramics particles in the sealing material paste from settling during the sealing process.

Next, the above-mentioned ceramic compact that has been subjected to the drying process and the mouth-sealing process is subjected to degreasing and sintering processes under predetermined conditions so that the columnar ceramic member in which a plurality of through holes are placed side by side in the length direction with a partition wall interposed therebetween is manufactured.

Here, with respect to the degreasing and sintering conditions and the like of the ceramic compact, it is possible to apply conditions that have been conventionally used for manufacturing columnar porous ceramic members.

Figure 4:
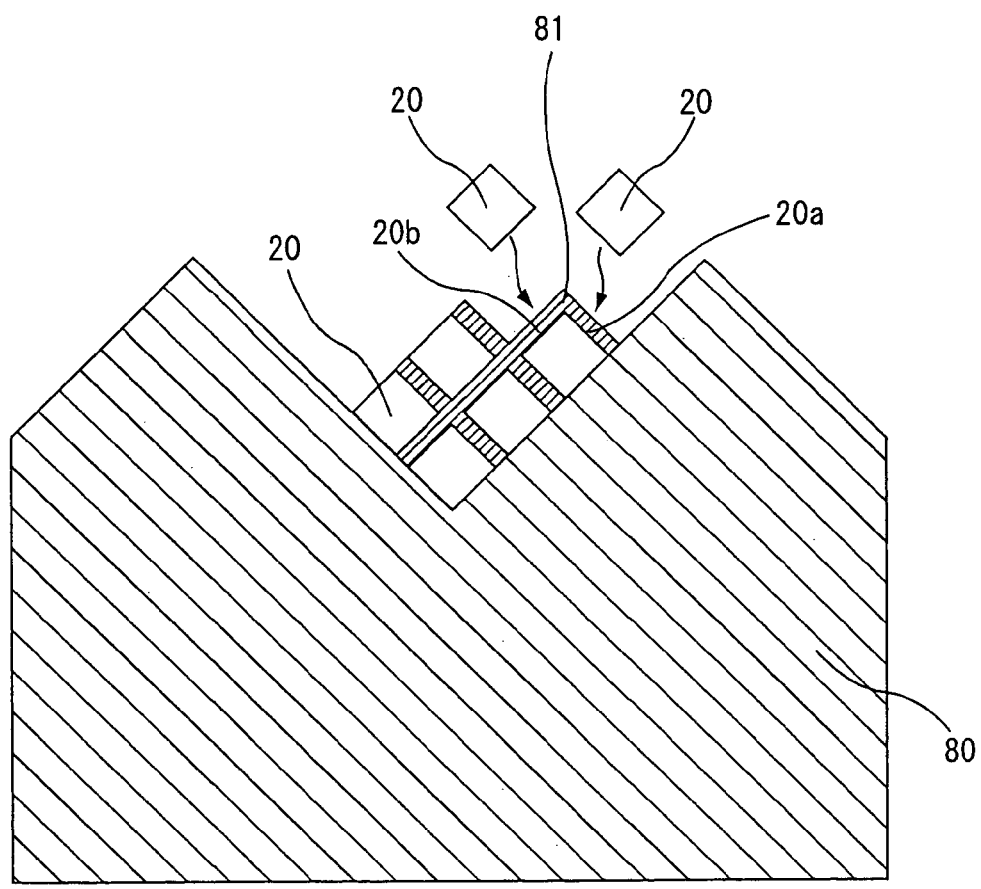
FIG. 4 is a side view that schematically shows a state where a honeycomb filter of the present invention is manufactured.

Moreover, as shown in FIG. 4, columnar porous ceramic members 20 are placed on a base 80 the upper portion of which is designed to have a V-shape in its cross-section so as to allow the columnar ceramic members 20 to be stacked thereon in a tilted manner, and sealing material paste to form a sealing material layer 14 is then applied onto two side faces 20a and 20b facing upward with an even thickness to form a sealing material paste layer 81; thereafter, a laminating process for forming another columnar porous ceramic member 20 on this sealing material paste layer 81 is successively repeated so that a laminated body of rectangular columnar porous ceramic members 20 having a predetermined size is manufactured.

With respect to the material for forming the above-mentioned sealing material paste, since the description thereof has already been given, the description thereof will not be given here.

Next, this laminated body of columnar porous ceramic members 20 is heated so that the sealing material paste layer 81 is dried and solidified to form a sealing material layer 14, and the circumferential face of this is then cut into a shape as shown in FIG. 1 by using a diamond cutter or the like; thus, a ceramic block 15 is manufactured.

Further, a sealing material layer 13 is formed on the circumference of the ceramic block 15 by using the above-mentioned sealing material paste so that the honeycomb structural body 10 of the present invention, formed by combining a plurality of columnar ceramic members 20 with one another through the sealing material layers 14, is manufactured.

With respect to the application of the honeycomb structural body of the present invention, although not particularly limited, it is desirably used for exhaust gas purifying apparatuses for use in vehicles.

Figure 5:
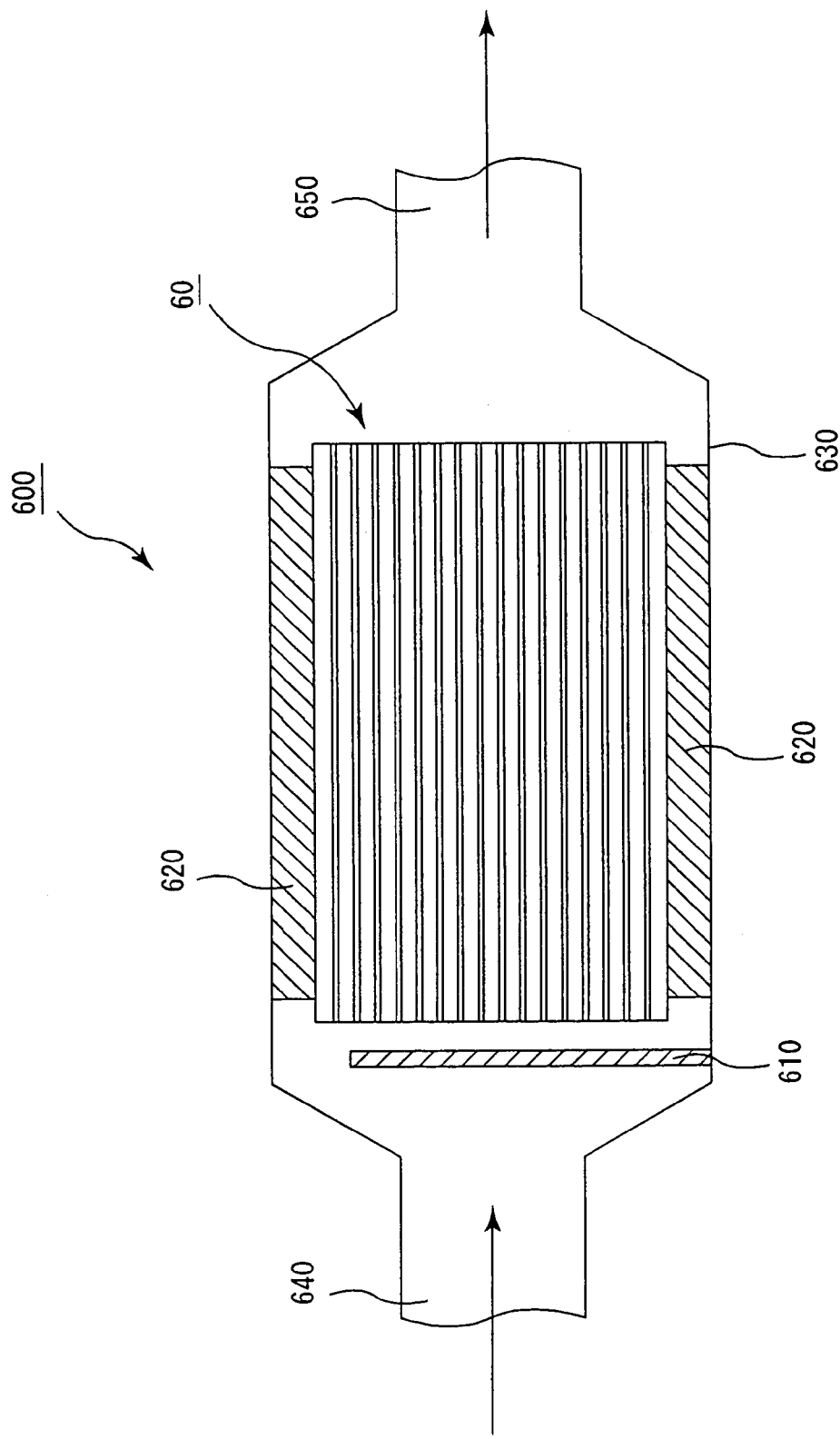
FIG. 5 is a cross-sectional view that schematically shows an example of an exhaust gas purifying apparatus in which the honeycomb structural body of the present invention is used.
Figure 6:
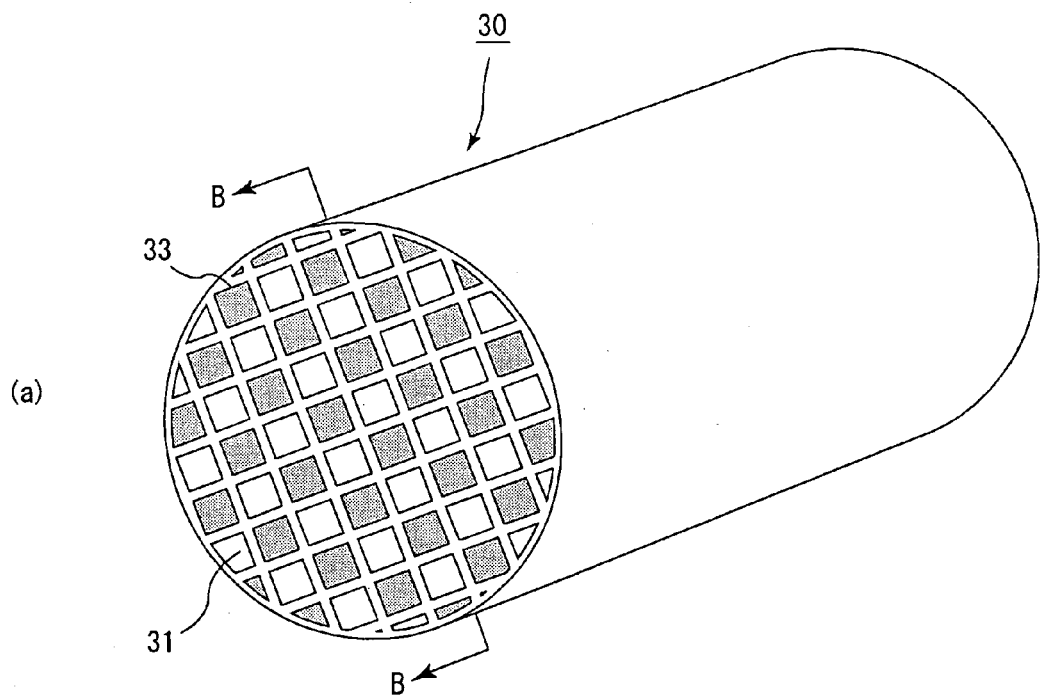
FIG. 6(a) is a perspective view that schematically shows one example of a conventional honeycomb structural body.
FIG. 6(b) is a cross-sectional view taken along line B-B in FIG. 6(a).
Figure 6:
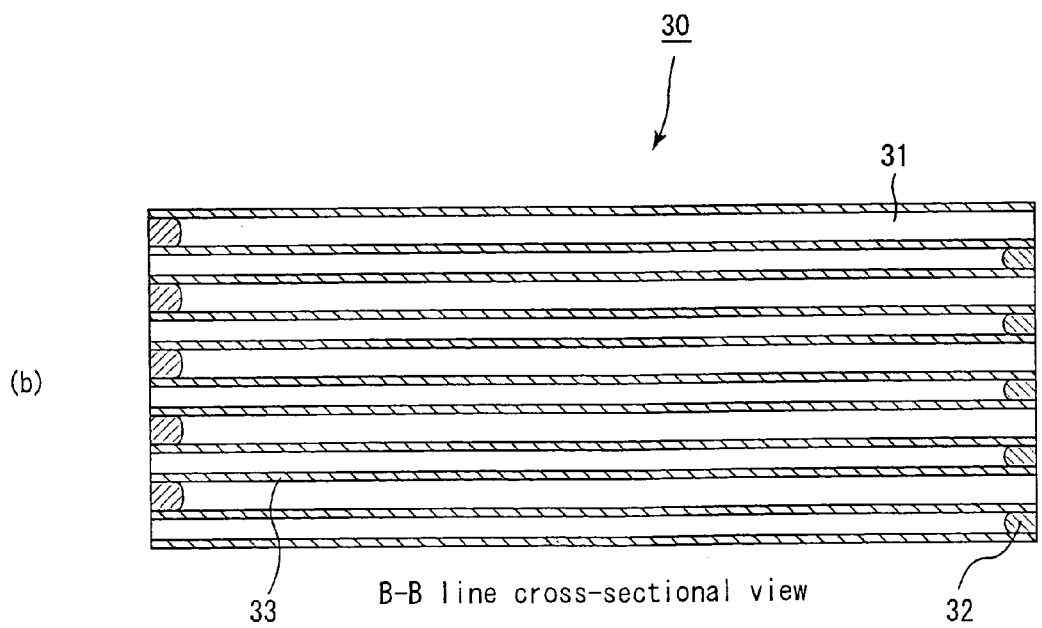

FIG. 5 is a cross-sectional view that schematically shows one example of an exhaust gas purifying apparatus for use in vehicles, which is provided with the honeycomb structural body of the present invention.

As shown in FIG. 5, an exhaust gas purifying apparatus 600 is mainly constituted by a honeycomb structural body 60 of the present invention, a casing 630 that covers the external portion of the honeycomb structural body 60, a holding sealing material 620 that is placed between the honeycomb structural body 60 and the casing 630 and a heating means 610 placed on the exhaust gas inlet side of the honeycomb structural body 60, and an introducing pipe 640, which is connected to an internal combustion device such as an engine, is connected to one end of the casing 630 on the exhaust gas inlet side, and a discharging pipe 650 externally coupled is connected to the other end of the casing 630. In FIG. 5, arrows show flows of exhaust gases.

In the exhaust gas purifying apparatus 600 having the above-mentioned arrangement, exhaust gases, discharged from the internal combustion device such as an engine, are directed into the casing 630 through the introducing pipe 640, and allowed to flow into the honeycomb structural body 60 through the inlet-side through holes and to pass through the partition wall; thus, the exhaust gases are purified, with particulates thereof being collected in the partition wall, and are then discharged out of the honeycomb structural body 60 through the outlet-side through holes, and discharged outside through the exhaust pipe 650.

After a great quantity of particulates have been accumulated on the partition wall of the honeycomb structural body 60 to cause an increase in pressure losses, the honeycomb structural body 60 is subjected to a recovering process.

In the recovering process, a gas, heated by using a heating means 610, is allowed to flow into the through holes of the honeycomb structural body 60 so that the honeycomb structural body 60 is heated to burn and eliminate the particulates deposited on the partition wall.

Moreover, the particulates may be burned and eliminated by using a post-injection system.

Moreover, the honeycomb structural body of the present invention may have a catalyst capable of purifying CO, HC, NOx and the like in the exhaust gases.

When such a catalyst is supported thereon, the honeycomb structural body of the present invention is allowed to function as a filter capable of collecting particulates in exhaust gases, and also to function as a catalyst converter for purifying CO, HC, NOx and the like contained in exhaust gases.

The above-mentioned catalyst may be supported on the porous surface of the honeycomb structural body of the present invention, or may be supported on the partition wall with a certain thickness. Moreover, the above-mentioned catalyst may be evenly supported on the porous surface and/or the surfaces, or may be supported on a specific place in a biased manner. In particular, when the catalyst is supported on the surfaces of the partition wall of the inlet-side through holes or on the surfaces of pores in the vicinity of the surface, or on both of the surfaces of these, the catalyst is easily made in contact with the particulates so that the particulates can be efficiently burned.

With respect to the catalyst to be supported on the honeycomb structural body of the present invention, not particularly limited as long as it can purify CO, HC, NOx and the like, examples thereof include noble metals such as platinum, palladium and rhodium. The catalyst, made from platinum, palladium and rhodium, is a so-called three-way catalyst, and the honeycomb structural body of the present invention which is provided with such a three-way catalyst is allowed to function in the same manner as conventionally known catalyst converters. Therefore, with respect to the case where the honeycomb structural body of the present invention also functions as a catalyst converter, detailed description thereof will not be given.

BEST MODE FOR CARRYING OUT THE PRESENT INVENTION

The following description will discuss the present invention in detail by means of examples; however, the present invention is not intended to be limited by these examples.

EXAMPLE 1

(1) Powder of α-type silicon carbide having an average particle size of 10 μm (60% by weight) and powder of β-type silicon carbide having an average particle size of 0.5 μm (40% by weight) were wet-mixed, and to 100 parts by weight of the resulting mixture were added and kneaded with 5 parts by weight of an organic binder (methyl cellulose) and 10 parts by weight of water to obtain a mixed composition. Next, after a slight amount of a plasticizer and a lubricant have been added and kneaded therein, the resulting mixture was extrusion-molded so that a formed product, which had almost the same cross-sectional shape as the cross-sectional shape shown in FIG. 3(a), was manufactured.

Next, the above-mentioned formed product was dried by using a micro-wave drier to form a ceramic dried body, and predetermined through holes were then filled with a paste having the same composition as the formed product. After having been again dried by using a drier, this was degreased at 400° C., and sintered at 2200° C. in a normal-pressure argon atmosphere for 3 hours to manufacture a columnar porous ceramic member 20, which was a silicon carbide sintered body, and had a porosity of 42%, an average pore diameter of 9 μm, a size of 36 mm×36 mm×150 mm, the number of through holes of 289 and a thickness of the partition wall 23 of 0.4 mm, with the same number of large-capacity through holes 21a and small-capacity through holes 21b being formed therein.

Here, on one end face of the columnar porous ceramic member 20, only the large-capacity through holes 21a are sealed with a sealing agent, and on the other end face thereof, only the small-capacity through holes 21b are sealed with a sealing agent.

The width of a cross section perpendicular to the length direction of the large-capacity through hole 21a was 1.65 mm, and the width of the cross section of the small-capacity through hole 21b was 1.33 mm, and with respect to a cross section perpendicular to the length direction of the columnar porous ceramic member 20, the ratio of areas of the large-capacity through holes 21a was 38.2%, and the ratio of areas of the small-capacity through holes 21b was 24.6%.

In the columnar porous ceramic member 20, the distance between centers of gravity in cross sections of adjacently located large-capacity through holes 21a and the distance between centers of gravity in cross sections of adjacently located small-capacity through holes 21b were 2.68 mm, and the aperture ratio was 1.55.

(2) By using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, the processes as described by reference to FIG. 4 were carried out so that, as shown in FIG. 3(g), 16 (4×4) columnar porous ceramic members 20 were combined with one another, with the large-capacity through holes being mutually made adjacent as well as with the small-capacity through holes being mutually made adjacent, and this was then cut by using a diamond cutter to form a cylindrical shaped ceramic block having a size of 144 mm in diameter×150 mm in length.

In this case, the thickness of the sealing material layers used for combining the columnar porous ceramic members 20 was adjusted to 1.0 mm.

Next, ceramic fibers made from alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 1.0 mm was formed on the circumferential portion of the ceramic block by using the above-mentioned sealing material paste. Further, this sealing material paste layer was dried at 120° C. so that a cylinder-shaped honeycomb structural body was manufactured.

EXAMPLE 2

The same processes as Example 1 were carried out except that the cross-sectional shape of the columnar porous ceramic member was made almost the same as a cross-sectional shape shown in FIG. 3(b) so that a honeycomb structural body was manufactured.

The thickness of the partition wall 43 of a columnar porous ceramic member 40 in accordance with Example 2 was 0.4 mm, the width of a cross section perpendicular to the length direction of the large-capacity through hole 41a was 1.84 mm, and the width of the cross section of the small-capacity through hole 41b was 1.14 mm, and with respect to a cross section perpendicular to the length direction of the columnar porous ceramic member 40, the ratio of areas of the large-capacity through holes 41a was 46.0%, and the ratio of areas of the small-capacity through holes 41b was 18.1%.

In the columnar porous ceramic member 40 of Example 2, the distance between centers of gravity in cross sections of adjacently located large-capacity through holes 41a and the distance between centers of gravity in cross sections of adjacently located small-capacity through holes 41b were 2.72 mm, and the aperture ratio was 2.54.

EXAMPLE 3

The same processes as Example 1 were carried out except that the cross-sectional shape of the columnar porous ceramic member was made almost the same as a cross-sectional shape shown in FIG. 3(c) so that a honeycomb structural body was manufactured.

The thickness of the partition wall 53 of a columnar porous ceramic member 50 in accordance with Example 3 was 0.4 mm, the width of a cross section perpendicular to the length direction of the large-capacity through hole 51a was 2.05 mm, and the width of the cross section of the small-capacity through hole 51b was 0.93 mm, and with respect to a cross section perpendicular to the length direction of the columnar porous ceramic member 50, the ratio of areas of the large-capacity through holes 51a was 53.5%, and the ratio of areas of the small-capacity through holes 51b was 12.0%.

In the columnar porous ceramic member 50 of Example 3, the distance between centers of gravity in cross sections of adjacently located large-capacity through holes 51a and the distance between centers of gravity in cross sections of adjacently located small-capacity through holes 51b were 2.79 mm, and the aperture ratio was 4.45.

EXAMPLES 4 TO 6

A columnar porous ceramic member, which was made of a silicon carbide sintered body having a porosity of 42%, an average pore diameter of 9 μm, a size of 72 mm×72 mm×150 mm, the number of through holes of 1156 and a thickness of the partition wall of 0.4 mm, with the same number of large-capacity through holes 21a and small-capacity through holes 21b being formed therein, was manufactured, and the same processes as those of Examples 1 to 3 were carried out except that, as shown in FIG. 3(g), four (2×2) of these columnar porous ceramic members were combined with one another, with the large-capacity through holes being mutually made adjacent as well as with the small-capacity through holes being mutually made adjacent, so that a ceramic block was manufactured; thus, a cylinder-shaped honeycomb structural body having a size of 144 mm in diameter×150 mm in length was manufactured.

Here, in Example 4, the cross-sectional shape of the columnar porous ceramic member was made almost the same as a cross-sectional shape shown in FIG. 3(a); in Example 5, the cross-sectional shape of the columnar porous ceramic member was made almost the same as a cross-sectional shape shown in FIG. 3(b); and in Example 6, the cross-sectional shape of the columnar porous ceramic member was made substantially the same as a cross-sectional shape shown in FIG. 3(c).

EXAMPLES 7 TO 9

A columnar porous ceramic member, which had almost the same cross-sectional shape as that shown in FIG. 11(a), FIG. 11(c) or FIG. 11(e), and was made of a silicon carbide sintered body having a porosity of 42%, an average pore diameter of 9 μm, a size of 36 mm×36 mm×150 mm and a thickness of the partition wall of 0.4 mm, was manufactured, and the same processes as those of Example 1 were carried out except that 16 (4×4) of these columnar porous ceramic members were combined with one another so that a ceramic block was manufactured; thus, a cylinder-shaped honeycomb structural body having a size of 144 mm in diameter× 150 mm in length was manufactured.

Here, in Example 7, the cross-sectional shape of the columnar porous ceramic member was made almost the same as a cross-sectional shape shown in FIG. 11(a); in Example 8, the cross-sectional shape of the columnar porous ceramic member was made almost the same as a cross-sectional shape shown in FIG. 11(c); and in Example 9, the cross-sectional shape of the columnar porous ceramic member was made almost the same as a cross-sectional shape shown in FIG. 11(e).

With respect to a cross section perpendicular to the length direction of the columnar porous ceramic member, the ratio of areas of the large-capacity through holes was about 52% in any one of the members, and the ratio of areas of the small-capacity through holes was about 13% in any one of the members, with the aperture ratio being set to 4.45. In the columnar porous ceramic members of Examples 7 to 9, the distance between centers of gravity in cross sections of adjacently located large-capacity through holes and the distance between centers of gravity in cross sections of adjacently located small-capacity through holes were set to the same value.

EXAMPLES 10 TO 12

A columnar porous ceramic member, which was made of a silicon carbide sintered body having a porosity of 42%, an average pore diameter of 9 μm, a size of 72 mm×72 mm×150 mm and a thickness of the partition wall of 0.4 mm, was manufactured, and the same processes as those of Examples 7 to 9 were carried out except that four (2×2) of these columnar porous ceramic members were combined with one another so that a ceramic block was manufactured; thus, a cylinder-shaped honeycomb structural body having a size of 144 mm in diameter×150 mm in length was manufactured.

Here, in Example 10, the cross-sectional shape of the columnar porous ceramic member was made substantially the same as a cross-sectional shape shown in FIG. 11(a); in Example 11, the cross-sectional shape of the columnar porous ceramic member was made almost the same as a cross-sectional shape shown in FIG. 11(c); and in Example 12, the cross-sectional shape of the columnar porous ceramic member was made almost the same as a cross-sectional shape shown in FIG. 11(e).

EXAMPLE 13 TO 15

Figure 7:
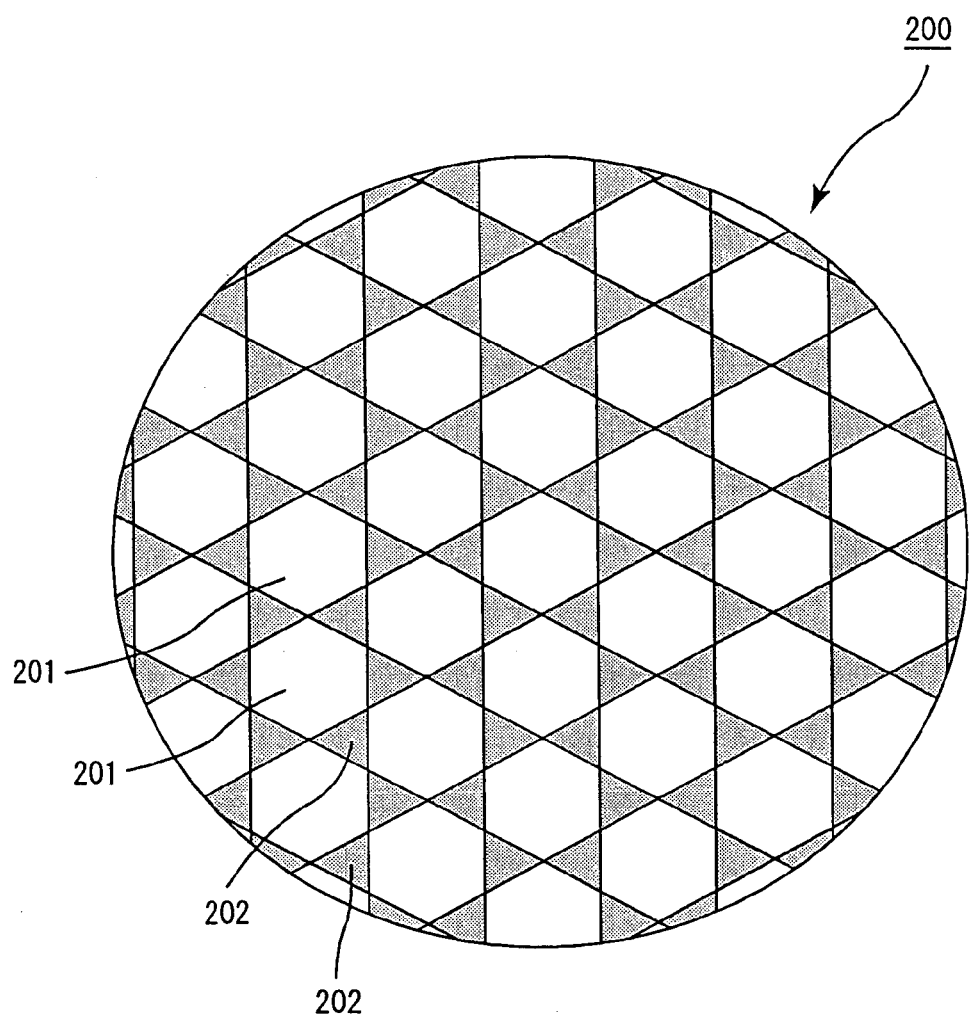
FIG. 7 is a perspective view that schematically shows one example of a honeycomb structural body.
Figure 8:
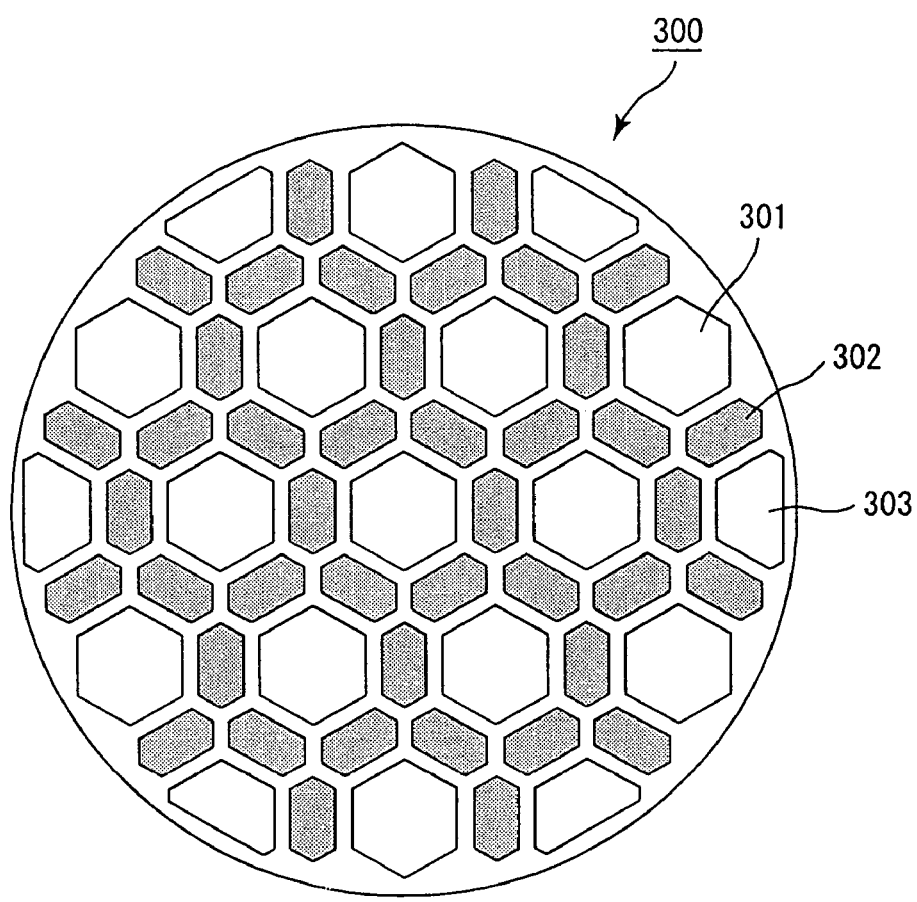
FIG. 8 is a perspective view that schematically shows another example of a honeycomb structural body.

A columnar porous ceramic member, which had almost the same cross-sectional shape as that shown in FIG. 7, FIG. 8 or FIG. 12, and was made of a silicon carbide sintered body having a porosity of 42%, an average pore diameter of 9 μm, a size of 72 mm×72 mm×150 mm (square column shape) and a thickness of the partition wall of 0.4 mm, was manufactured, and the same processes as those of Example 1 were carried out except that four (2×2) of these columnar porous ceramic members were combined with one another so that a ceramic block was manufactured; thus, a cylinder-shaped honeycomb structural body having a size of 144 mm in diameter×150 mm in length was manufactured.

Here, FIG. 7 is a cross-sectional view that schematically shows a cross section perpendicular to the length direction of a honeycomb structural body 200, and this honeycomb structural body 200 has a structure in which small-capacity through holes 202 having a triangle shape in the cross section are placed on the circumference of each large-capacity through hole 201 having a hexagonal shape in the cross section.

FIG. 8 is a cross-sectional view that schematically shows a cross section perpendicular to the length direction of a honeycomb structural body 300, and this honeycomb structural body 300 has a structure in which small-capacity through holes 302 having a laterally elongated hexagonal shape in the cross section are placed on the circumference of each large-capacity through hole 301 having a positive hexagonal shape in the cross section. Further, large-capacity through holes 301 having a positive hexagonal shape and large-capacity through holes 303 having a trapezoidal shape are placed side by side.

In Example 13, the cross-sectional shape of the columnar porous ceramic member is made almost the same as the cross-sectional shape shown in FIG. 7; in Example 14, the cross-sectional shape of the columnar porous ceramic member is made almost the same as the cross-sectional shape shown in FIG. 8; and in Example 15, the cross-sectional shape of the columnar porous ceramic member is made substantially the same as the cross-sectional shape shown in FIG. 12.

In the columnar porous ceramic members, the ratios of areas of the large-capacity through holes in a cross section perpendicular to the length direction were respectively set to about 48% (Example 13), about 34% (Example 14) and about 51% (Example 15), the ratios of areas of the small-capacity through holes were respectively set to about 16% (Example 13), about 26% (Example 14) and about 10% (Example 15), and the aperture ratios were respectively set to 3 (Example 13), 1.28 (Example 14) and 5 (Example 15).

EXAMPLES 16 TO 18

The same processes as Examples 1 to 3 were carried out except that, upon combining 16 (4×4) columnar porous ceramic members 20, these members were combined so that the large-capacity through holes were not made adjacent to each other and so that the small-capacity through holes were not made adjacent to each other, as shown in FIG. 3(h); thus, a honeycomb structural body was manufactured.

Here, Example 16 corresponds to Example 1, Example 17 corresponds to Example 2, and Example 18 corresponds to Example 3.

EXAMPLES 19 TO 21

The same processes as Examples 1 to 3 were carried out except that, instead of combining 16 (4×4) columnar porous ceramic members 20 by using sealing material paste, a partition wall member having a thickness of 1.0 mm, made of a silicon carbide sintered body, was inserted between the columnar porous ceramic members 20 and that a sealant paste layer was not formed on the peripheral portion; thus, a cylinder-shaped honeycomb structural body having a size of 144 mm in diameter×150 mm in length was manufactured.

Here, in the honeycomb structural bodies in accordance with Examples 19 to 21, the columnar porous ceramic members 20 are not bonded to one another; however, upon using as an exhaust gas purifying apparatus or the like, these are physically tightened together, and used as one integral part.

Further, Example 19 corresponds to Example 1, Example 20 corresponds to Example 2, and Example 21 corresponds to Example 3.

COMPARATIVE EXAMPLES 1 TO 3

A columnar porous ceramic member, which was made of a silicon carbide sintered body having a porosity of 42%, an average pore diameter of 9 μm, a size of 144 mm×144 mm×150 mm, the number of through holes of 4624 and a thickness of the partition wall of 0.4 mm, with the same number of large-capacity through holes 21a and small-capacity through holes 21b being formed therein, was manufactured, and the same processes as those of Examples 1 to 3 were carried out except that the peripheral portion of each of these columnar porous ceramic members was processed so that a ceramic block was manufactured; thus, a cylinder-shaped honeycomb structural body having a size of 144 mm in diameter×150 mm in length was manufactured.

Here, in Comparative Example 1, the cross-sectional shape of the columnar porous ceramic member was made almost the same as a cross-sectional shape shown in FIG. 3(a); in Comparative Example 2, the cross-sectional shape of the columnar porous ceramic member was made almost the same as a cross-sectional shape shown in FIG. 3(b); and in Comparative Example 3, the cross-sectional shape of the columnar porous ceramic member was made almost the same as a cross-sectional shape shown in FIG. 3(c).

COMPARATIVE EXAMPLE 4

The same processes as Example 1 were carried out except that the cross-sectional shape of the columnar porous ceramic member was made almost the same as a cross-sectional shape shown in FIG. 3(e) so that a honeycomb structural body was manufactured.

The thickness of the partition wall of a columnar porous ceramic member in accordance with Comparative Example 4 was 0.4 mm, the width of one side in a cross section perpendicular to the length direction of the through hole was 1.49 mm, and with respect to a cross section perpendicular to the length direction of the columnar porous ceramic member, the ratio of areas of the through holes was 30.6%.

In other words, in the columnar porous ceramic member of Comparative Example 4, the distance between centers of gravity in cross-sections of the through holes was 2.67 mm, and the aperture ratio was 1.00.

COMPARATIVE EXAMPLES 5 TO 7

A columnar porous ceramic member, which was made of a silicon carbide sintered body having a porosity of 42%, an average pore diameter of 9 μm, a size of 144 mm×144 mm×150 mm and a thickness of the partition wall of 0.4 mm, was manufactured, and the same processes as those of Examples 7 to 9 were carried out except that the circumferential portion of each of these columnar porous ceramic members was processed so that a ceramic block was manufactured; thus, a cylinder-shaped honeycomb structural body having a size of 144 mm in diameter×150 mm in length was manufactured.

Here, in Comparative Example 5, the cross-sectional shape of the columnar porous ceramic member was made almost the same as a cross-sectional shape shown in FIG. 11(a); in Comparative Example 6, the cross-sectional shape of the columnar porous ceramic member was made almost the same as a cross-sectional shape shown in FIG. 11(c); and in Comparative Example 7, the cross-sectional shape of the columnar porous ceramic member was made almost the same as a cross-sectional shape shown in FIG. 11(e).

COMPARATIVE EXAMPLES 8 TO 10

A columnar porous ceramic member, which was made of a silicon carbide sintered body having a porosity of 42%, an average pore diameter of 9 μm, a size of 144 mm×144 mm×150 mm (rectangular column shape) and a thickness of the partition wall of 0.4 mm, was manufactured, and the same processes as those of Examples 13 to 15 were carried out except that the circumferential portion of each of these columnar porous ceramic members was processed so that a ceramic block was manufactured; thus, a cylinder-shaped honeycomb structural body having a size of 144 mm in diameter×150 mm in length was manufactured.

Here, in Comparative Example 8, the cross-sectional shape of the columnar porous ceramic member was made almost the same as a cross-sectional shape shown in FIG. 7; in Comparative Example 9, the cross-sectional shape of the columnar porous ceramic member was made almost the same as a cross-sectional shape shown in FIG. 8; and in Comparative Example 10, the cross-sectional shape of the columnar porous ceramic member was made substantially the same as a cross-sectional shape shown in FIG. 12.

(Evaluation Method)

(1) Collection State of Particulates

An exhaust gas purifying apparatus shown in FIG. 5 was manufactured by installing each of the honeycomb structural bodies relating to the respective examples and comparative examples in an exhaust passage of an engine, and the engine was driven at the number of revolutions of 2000 min⁻ and a torque of 50 Nm for a predetermined period of time so that the honeycomb structural body was allowed to collect particulates of about 7 g/L. Then, the honeycomb structural body was cut, and by observing the cross section, the thickness of the collected particulates was measured. The measured portions were set to portions respectively 50 mm and 130 mm apart from the end face of the exhaust gas inlet side, in the vicinity of the center (portions apart from the center by two cells) of a cross section perpendicular to the length direction. The ratio (50 mm measured value/130 mm measured value) between the measured value at the portion of 50 mm and the measured value at the portion of 130 mm was found. The results are shown in Table 1.

(2) Collection Limit

An exhaust gas purifying apparatus shown in FIG. 5 was manufactured by installing each of the honeycomb structural bodies relating to the respective examples and comparative examples in an exhaust passage of an engine, and the engine was driven at the number of revolutions of 2000 min$^{-1}$ and a torque of 50 Nm for a predetermined period of time, and the recovering process was then successively carried out while increasing the driving time so that the honeycomb structural body was examined for occurrence of any cracks. Here, the quantity of particulates that had been collected at the time of occurrence of a crack was defined as a collection limit value. The results are shown in Table 1.

(3) Variation in Pressure Loss

Figure 9:
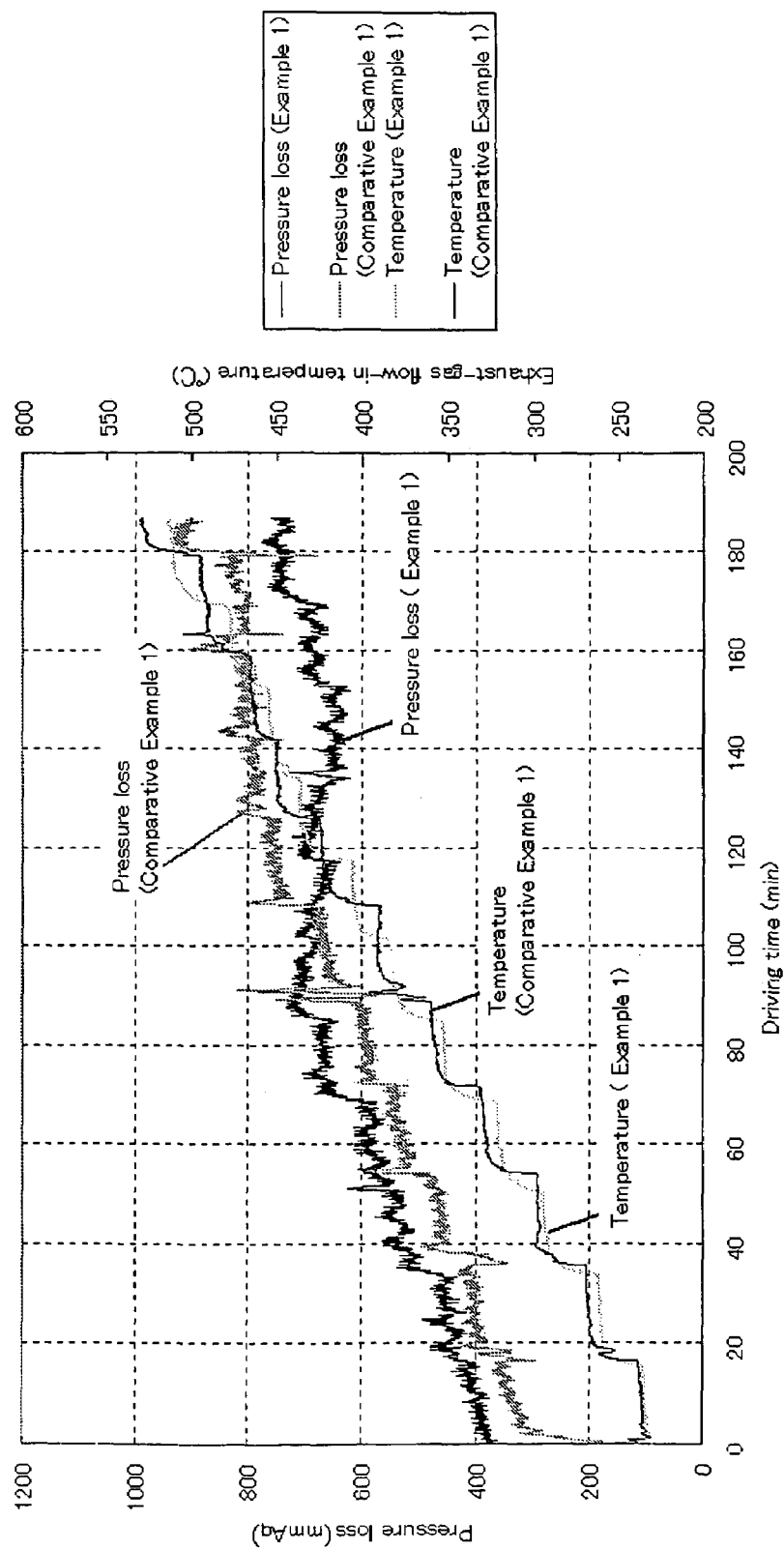
FIG. 9 is a graph which indicates the relationship between the pressure loss and the temperature of inflow exhaust gas in association with the operation time (collection amount of particulates) in honeycomb structural bodies in accordance with Example 1 and Comparative Example 1.

An exhaust gas purifying apparatus shown in FIG. 5 was manufactured by installing each of the honeycomb structural bodies relating to Example 1 and Comparative Example 1 in an exhaust passage of an engine of 3L, and the engine was driven constantly at the number of revolutions of 2000 min⁻ while the flow rate of the exhaust gas was changed by increasing the load (torque) from 10 Nm by 2.5 Nm for every 15 minutes in a separate manner in 10 stages; thus, the relationship between the pressure loss (102 mmAq=1 KPa) and the flow-in temperature of the exhaust gas with respect to the driving time (quantity of collection of particulates). The results are shown in FIG. 9.

TABLE 1

| | Thickness ratio of particulates | Collection limit (g/L) |
|---|---|---|
| Example 1 | 0.92 | 8.6 |
| Example 2 | 0.85 | 9.5 |
| Example 3 | 0.82 | 8.7 |
| Example 4 | 0.80 | 7.9 |
| Example 5 | 0.72 | 8.8 |
| Example 6 | 0.65 | 8.0 |
| Example 7 | 0.84 | 8.5 |
| Example 8 | 0.86 | 8.6 |
| Example 9 | 0.86 | 8.6 |
| Example 10 | 0.72 | 7.8 |
| Example 11 | 0.74 | 7.9 |
| Example 12 | 0.73 | 7.9 |
| Example 13 | 0.68 | 7.1 |
| Example 14 | 0.66 | 7.6 |
| Example 15 | 0.64 | 7.0 |
| Example 16 | 0.80 | 8.5 |
| Example 17 | 0.80 | 9.3 |
| Example 18 | 0.75 | 8.6 |
| Example 19 | 0.75 | 8.3 |
| Example 20 | 0.71 | 9.0 |
| Example 21 | 0.68 | 8.0 |
| Comparative Example 1 | 0.45 | 6.1 |
| Comparative Example 2 | 0.40 | 7.0 |
| Comparative Example 3 | 0.32 | 6.2 |
| Comparative Example 4 | 0.92 | 7.8 |
| Comparative Example 5 | 0.37 | 6.0 |
| Comparative Example 6 | 0.39 | 6.1 |
| Comparative Example 7 | 0.39 | 6.1 |
| Comparative Example 8 | 0.31 | 4.6 |
| Comparative Example 9 | 0.29 | 5.1 |
| Comparative Example 10 | 0.27 | 4.5 |

As clearly indicated by the results shown in Table 1, with respect to the quantity of collection of particulates in the collection limit, the honeycomb structural bodies in accordance with the examples can collect more particulates than the honeycomb structural bodies in accordance with the comparative examples, thereby making it possible to lengthen the period up to the recovery process.

Moreover, it has been found that each of the honeycomb structural bodies in accordance with the examples makes the rise width of the pressure loss smaller in comparison with the honeycomb structural bodies in accordance with the comparative examples.

Moreover, the results shown in FIG. 9 indicate that, upon increasing the flow rate of exhaust gases by changing the load at the same number of revolutions, although the initial pressure loss becomes higher than that of the integrated structure (comparative examples), the divided structure, prepared by the examples, gradually suppresses the rise in the pressure loss, thereby making it possible to avoid abrupt changes in the pressure loss.

INDUSTRIAL APPLICABILITY

The honeycomb structural body of the present invention is provided with a group of large-capacity through holes and a group of small-capacity through holes so that by using the group of large-capacity through holes as inlet-side through holes, the aperture ratio on the exhaust gas inlet side is made relatively greater; thus, it becomes possible to reduce the rise width of pressure loss upon accumulation of particulates. Consequently, in comparison with the honeycomb structural body in which the aperture ratio on the exhaust gas inlet side and the aperture ratio on the exhaust gas outlet side are equal to each other, it becomes possible to increase the limiting amount of particulate collection to consequently lengthen the period up to the recovery process, and to accumulate a greater amount of ashes remaining after the particulates have been burned to consequently lengthen the service life.

Moreover, the honeycomb structural body of the present invention is constituted by a plurality of columnar porous ceramic members; therefore, it becomes possible to effectively reduce the rise width of the pressure loss at the time the particulates are accumulated, and to suppress fluctuations in the pressure loss even at the time that the flow rate of exhaust gases fluctuates in response to the driving state of the internal combustion engine. Furthermore, it is possible to reduce a thermal stress that is generated in the use so that the heat resistance is improved, and to freely adjust the size thereof by properly increasing or reducing the number of the columnar porous ceramic members.

The invention claimed is:

1. A honeycomb structural body comprising:
a plurality of porous ceramic members combined with one another, the porous ceramic members each having a plurality of large-capacity through holes and a plurality of small-capacity through holes extending in parallel with one another in a length direction and having a polygonal shape in a cross-section perpendicular to the length direction,
wherein the large-capacity through holes are sealed at one end of the porous ceramic members, the small-capacity through holes are sealed at the other end of the porous ceramic members, and the large-capacity through holes have a total cross-section area which is larger than a total cross-section area of the small-capacity through holes.

2. The honeycomb structural body according to claim 1, wherein the porous ceramic members are combined with one another with a sealing material therebetween.

3. The honeycomb structural body according to claim 1, wherein a distance between centers of gravity in the cross-section of the nearest large-capacity through holes is equal to a distance between centers of gravity in the cross-section of the nearest small-capacity through holes.

4. The honeycomb structural body according to claim 1, wherein the large-capacity through holes and/or the small-capacity through holes have a polygonal shape.

5. The honeycomb structural body according to claim 1, wherein the large-capacity through holes and/or small-capacity through holes have chamfered corner portions in the cross-section.

6. The honeycomb structural body according to claim 1, wherein the small-capacity through holes have a quadrangle or square shape in the cross-section.

7. The honeycomb structural body according to claim 1, wherein a ratio of a total cross-section area of the large-capacity through holes to a total cross-section area of the small-capacity through holes is set in a range from 1.01 to 9.00.

8. An exhaust gas purifying apparatus for a vehicle, comprising:
a plurality of porous ceramic members combined with one another, the porous ceramic members each having a plurality of large-capacity through holes and a plurality of small-capacity through holes extending in parallel with one another in a length direction and having a polygonal shape in a cross-section perpendicular to the length direction,
wherein the large-capacity through holes are sealed at one end of the porous ceramic members, the small-capacity through holes are sealed at the other end of the porous ceramic members, and the large-capacity through holes have a total cross-section area which is larger than a total cross-section area of the small-capacity through holes.

9. The exhaust gas purifying apparatus according to claim 8, wherein the porous ceramic members are combined with one another with a sealing material therebetween.

10. The exhaust gas purifying apparatus according to claim 8, wherein a distance between centers of gravity in the cross-section of the nearest large-capacity through holes is equal to a distance between centers of gravity in the cross-section of the nearest small-capacity through holes.

11. The exhaust gas purifying apparatus according to claim 8, wherein the large-capacity through holes and/or the small-capacity through holes have a polygonal shape.

12. The exhaust gas purifying apparatus according to claim 8, wherein the large-capacity through holes and/or small-capacity through holes have chamfered corner portions in the cross-section.

13. The exhaust gas purifying apparatus according to claim 8, wherein the small-capacity through holes have a quadrangle or square shape in the cross-section.

14. The exhaust gas purifying apparatus according to claim 8, wherein a ratio of a total cross-section area of the large-capacity through holes to a total cross-section area of the small-capacity through holes is set in a range from 1.01 to 9.00.

15. The exhaust gas purifying apparatus according to claim 9, wherein the sealing material comprises at least one binder selected from the group consisting of an inorganic binder and an organic binder.

16. The exhaust gas purifying apparatus according to claim 8, wherein the large-capacity and small-capacity through holes bodies are alternately formed in each of the porous ceramic members.

17. The exhaust gas purifying apparatus according to claim 8, wherein each of the porous ceramic members has a quadrangle or square shape in the cross-section.

18. The honeycomb structural body according to claim 1, wherein the large-capacity and small-capacity through holes are alternately formed in each of the structural bodies.

19. The honeycomb structural body according to claim 2, wherein the sealing material comprises at least one binder selected from the group consisting of an inorganic binder and an organic binder.

20. The honeycomb structural body according to claim 1, wherein each of the porous ceramic members has a quadrangle or square shape in the cross-section.

* * * * *